United States Patent
Fujiwara

(10) Patent No.: US 7,475,336 B2
(45) Date of Patent: Jan. 6, 2009

(54) DOCUMENT INFORMATION PROCESSING APPARATUS AND DOCUMENT INFORMATION PROCESSING PROGRAM

(75) Inventor: Akihiko Fujiwara, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 328 days.

(21) Appl. No.: 10/915,361

(22) Filed: Aug. 11, 2004

(65) Prior Publication Data

US 2006/0036934 A1 Feb. 16, 2006

(51) Int. Cl.
G06F 17/00 (2006.01)

(52) U.S. Cl. .................. 715/230; 715/229; 715/248

(58) Field of Classification Search .......... 715/500, 715/500.1, 511, 512, 515, 522, 526, 530, 715/200, 201, 229, 230, 248, 255, 273
See application file for complete search history.

(56) References Cited

U.S. PATENT DOCUMENTS

| | | | | |
|---|---|---|---|---|
| 6,427,032 | B1* | 7/2002 | Irons et al. | 382/306 |
| 6,988,093 | B2* | 1/2006 | Pic et al. | 707/1 |
| 7,272,610 | B2* | 9/2007 | Torres | 707/101 |
| 2002/0054364 | A1* | 5/2002 | Asahi | 358/403 |
| 2004/0008884 | A1* | 1/2004 | Simske et al. | 382/165 |
| 2004/0088313 | A1* | 5/2004 | Torres | 707/101 |
| 2004/0146199 | A1* | 7/2004 | Berkner et al. | 382/176 |
| 2004/0267595 | A1* | 12/2004 | Woodings et al. | 705/9 |
| 2005/0039021 | A1* | 2/2005 | Alattar et al. | 713/176 |
| 2005/0041860 | A1* | 2/2005 | Jager | 382/173 |
| 2005/0060643 | A1* | 3/2005 | Glass et al. | 715/501.1 |
| 2005/0135708 | A1* | 6/2005 | Joyce | 382/306 |
| 2005/0193083 | A1* | 9/2005 | Han et al. | 709/213 |
| 2005/0210008 | A1* | 9/2005 | Tran et al. | 707/3 |
| 2005/0210009 | A1* | 9/2005 | Tran | 707/3 |

FOREIGN PATENT DOCUMENTS

| | | |
|---|---|---|
| JP | 2002-116946 A | 4/2002 |
| JP | 2002-245064 A | 8/2002 |
| WO | WO 2004/066613 A2 | 8/2004 |

OTHER PUBLICATIONS

U.S. Appl. No. 10/793,894, filed Mar. 8, 2004, Fujiwara.
U.S. Appl. No. 10/608,041, filed Jun. 30, 2003, Fujiwara.
U.S. Appl. No. 10/392,883, filed Mar. 21, 2003, Fujiwara.

* cited by examiner

Primary Examiner—Stephen S Hong
Assistant Examiner—Gregory J Vaughn
(74) Attorney, Agent, or Firm—Foley & Lardner LLP

(57) ABSTRACT

A document information processing apparatus is obtained in which there is no need to provide the consistency of management between the instances of documents and their metadata, that is, there is no fear that inconsistency in management might be caused, thereby eliminating the possibility of loading the system, which would otherwise result from the provision of managerial consistency, as well as making it possible to improve their versatility. The apparatus includes a document input and output section that is able to at least input or output a document as an image data, an operation timing detection section that detects predetermined operation timing for the document, a metadata acquisition section that acquires metadata of the document based on the operation timing, and a metadata description section that describes the metadata in a predetermined format based on instance data of the document at predetermined timing with respect to the input or output of the document.

20 Claims, 24 Drawing Sheets

FIG. 19

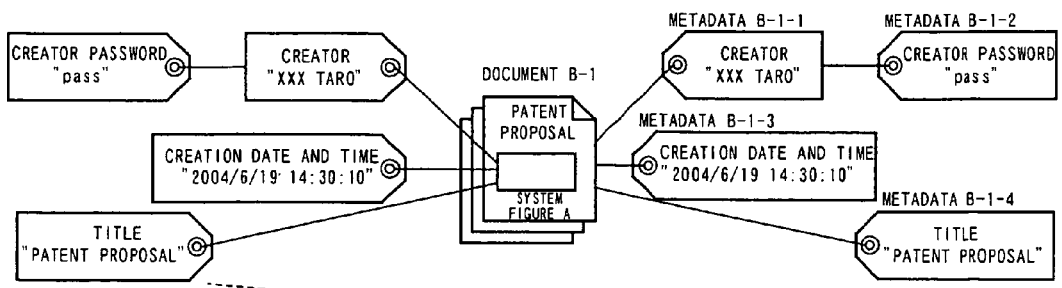

```
%PDF1.4

DISPLAY OBJECT page01
<IMAGE STREAM ON PAGE 1>

DISPLAY OBJECT page02
<IMAGE STREAM ON PAGE 2>

...

NON-DISPLAY OBJECT  METADATA
<CREATOR>
XXX HANAKO
</CREATOR>
<CREATOR PASSWORD>
 word
</CREATOR PASSWORD>
<CREATION DATA AND TIME>
2004/3/17 12:10:40
</CREATION DATA AND TIME>
<TITLE>
DESIGN SPECIFICATION
</TITLE>

DISPLAY OBJECT  COMPONENT ELEMENT   DIAGRAM
<IMAGE STREAM OF SYSTEM FIGURE B>
METADATA OF THIS COMPONENT ELEMENT
<CREATOR>
XXX TARO
</CREATOR>
<CREATOR PASSWORD>
pass
</CREATOR PASSWORD>
<CREATION DATA AND TIME>
2004/6/19 14:30:10
</CREATION DATA AND TIME>
<TITLE>
PATENT PROPOSAL
</TITLE>
```

```
%PDF1.4

DISPLAY OBJECT page01
<IMAGE STREAM ON PAGE 1>

DISPLAY OBJECT page02
<IMAGE STREAM ON PAGE 2>

...

NON-DISPLAY OBJECT  METADATA
<CREATOR>
XXX TARO
</CREATOR>
<CREATOR PASSWORD>
 pass
</CREATOR PASSWORD>
<CREATION DATA AND TIME>
2004/6/19 14:30:10
</CREATION DATA AND TIME>
<TITLE>
PATENT PROPOSAL
</TITLE>

DISPLAY OBJECT  COMPONENT ELEMENT   DIAGRAM
<IMAGE STREAM OF SYSTEM FIGURE A>
METADATA OF THIS COMPONENT ELEMENT
<CREATOR>
XXX TARO
</CREATOR>
<CREATOR PASSWORD>
pass
</CREATOR PASSWORD>
<CREATION DATA AND TIME>
2004/6/19 14:30:10
</CREATION DATA AND TIME>
<TITLE>
PATENT PROPOSAL
</TITLE>
```

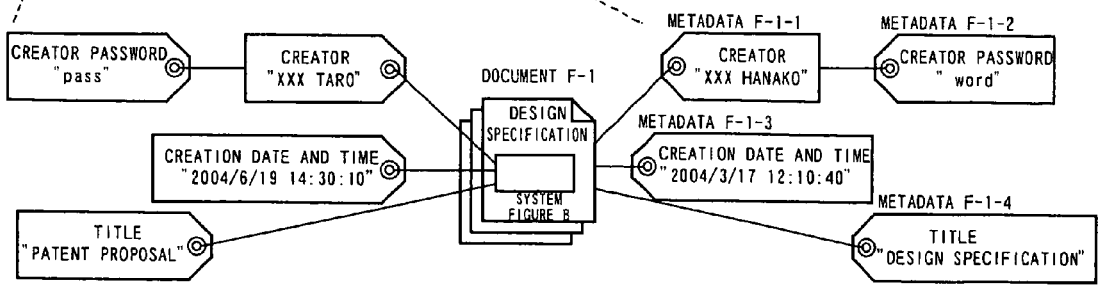

DOCUMENT INFORMATION PROCESSING APPARATUS AND DOCUMENT INFORMATION PROCESSING PROGRAM

BACKGROUND OF THE INVENTION

1. Field of the Invention

The present invention relates to a document information processing apparatus and a document data information processing program capable of managing documents by writing or describing metadata in the form of information on the documents into document files in the form of image data.

Here, note that a document means a document or text file of an application and a data file of a format such as an image format, an audio format or the like.

In addition, a document information processing apparatus means an apparatus that processes, registers and manages documents and their metadata, and information on the documents to be managed includes location information on the documents existing on a system (which, for example in an explore, a file viewer, of a Microsoft Windows, is managed as paths in a folder structure that depends on a Windows file system), links (for example, links to respective application forms of enterprise portals), layout or placement structures according to contents (for example, categories of Yahoo), and so on. Also, this apparatus can further contains systems that provide management structures to keep or store documents themselves (for example, document management systems). The apparatus is available from a plurality of users and has a user authentication function and a function to be shared through networks. Moreover, the apparatus is able to cooperate with various devices of the above-mentioned document input-output system so as to extend a function to perform media conversion between paper data and electronic data and an external communication facility such as facsimile.

2. Description of the Related Art

In the past, the management of documents carried out in a general document input-output system is performed by associating the documents with metadata possessed by the documents (for example, see Japanese patent application laid-open No. 2002-245064).

Here, note that the metadata of each document includes attribute and/or property information such as the author or creator of the document, the group to which the creator belongs, the place in which the creator is mainly resident, users of the document, the group or groups to which the users belong, the place or places in which the users are mainly resident, the data and time of creation, the weather at the time of creation, the environment around the creator at the time of creation, the dates and times of use, the weathers at the time of use, the environments around the users, the applications used for creation, etc.

Specifically, in case where information on the user who create a document is managed as metadata together with document information, the document and the user information are respectively kept or stored in a database separately from each other. In this case, the user information is stored in the form of a user table or the like together with a plurality of pieces of other user information. Further, the documents and the user information are made consistent with each other so as to make it possible to mutually associate them with one another.

In such a system, however, as the amount of documents to be managed increases, it becomes necessary to use a retrieval means for finding or retrieving desired documents. In such a case, conventional systems generally provide the following functions so as to assist the finding or retrieval operation of the users: (1) Storage folders and categories can be set for the documents to be retrieved, so that the documents can be properly arranged and organized by using such a management structure; (2) The documents can be retrieved in accordance with their contents through full-text searches; and (3) The documents are sorted through a user view capable of displaying a list of the documents by making use of metadata thereof. These functions can be used independently of one another as well as in their proper combinations.

In the above-mentioned conventional technique, in the case of managing the metadata, there is provided a module for managing identifiers corresponding to the instances of the documents in a collective manner, and the module serves to perform the management of the metadata of the pertinent documents by associating the metadata with the instances of the documents. In this case, the metadata are not attached to the document instances themselves, so when the metadata corresponding to the pertinent documents are made reference to, it is necessary to access a module that collectively manages the metadata.

Here, note that the instances of the documents in this application are actual instances that depend on the styles or formats by which the documents are described. For example, in a Windows file system, they are files that are managed thereon, and in a document management system, they are data records or the like that are stored in a database managing images thereon. Also, the stiles or formats mean storage forms specific to TIF file operation modules, PDF file operation modules, document management systems, and so on. Here, the modules means software modules that are possessed by the respective component devices of the document information processing apparatus or components of the document input-output system.

In such a management method, the correspondence (link relation) between the instances of pertinent documents and the identifiers collectively managed by the modules might collapse or break off, and processes for prevention of such a situation carried out in the modules might load the entire system. In addition, since the management of the instances of the documents and their metadata has to be made consistent, such management becomes dependent on the system, so the versatility of the document management with other systems that do not adopt the pertinent document management system will be lost, thus giving rise to the problem that the portability of the documents to the other systems will also be lost.

SUMMARY OF THE INVENTION

The present invention is intended to obviate the problems as referred to above, and has for its object to provide a document information processing apparatus and a document information processing program in which there is no need to provide the consistency of management between the instances of documents and their metadata, that is, there is no fear that inconsistency in management might be caused, thereby eliminating the possibility of loading the system, which would otherwise result from the provision of managerial consistency, as well as making it possible to improve their versatility.

In order to solve the above-mentioned problems, a document information processing apparatus according to the present invention comprises: a document input and output section that is able to at least input or output a document as image data; an operation timing detection section that detects predetermined operation timing for the document; a metadata acquisition section that acquires metadata of the document based on the operation timing; and a metadata description section that describes the metadata in a predetermined format based on instance data of the document at predetermined timing with respect to the input or output of the document.

In addition, a document information processing program according to the present invention makes a computer execute: an operation timing detection step that detects the timing of an operation performed on at least one of an input and an output of a document as image data; a metadata acquisition step that acquires metadata of the document based on the operation timing; and a metadata description step that describes the metadata in a predetermined format based on instance data of the document at predetermined timing with respect to the input or output of the document.

BRIEF DESCRIPTION OF THE DRAWINGS

FIG. 19 is a view conceptually showing a document obtained in the sixth embodiment.

DESCRIPTION OF THE PREFERRED EMBODIMENTS

Hereinafter, preferred embodiments of the present invention will be described in detail while referring to the accompanying drawings.

Figure 1:
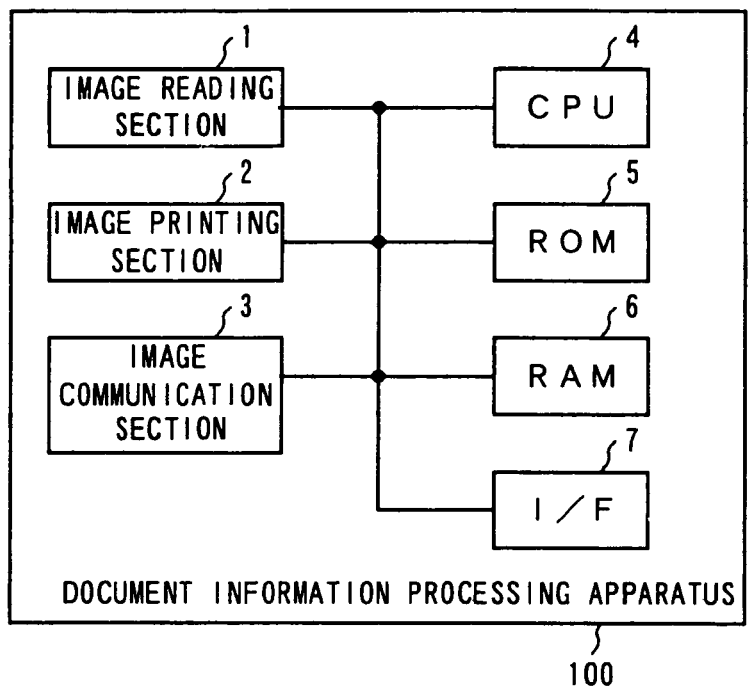
FIG. 1 is a block diagram showing the basic configuration of a system according to one embodiment of the present invention.

FIG. 1 is a block diagram that shows the basic configuration of a document information processing apparatus according to one embodiment of the present invention.

This document information processing apparatus 100 includes an image reading section (image reading device) 1 such as a scanner for reading sheet (e.g., paper) documents to obtain image data through electronic processing, an image printing section (printing device) 2 such as printer for printing on paper image files with electronic formats (PDF, TIFF, etc.) and the contents of documents created by applications (document files created by word processor applications, etc.), which have been converted into bitmap formats or the like, an image communication section 3 for sending and receiving image information through communications with the outside such as facsimile transmission, e-mails with image files attached thereto, etc., by using network communication lines such as telephone lines, LANs, etc., a CPU 4 that constitutes a control section, a ROM (Read Only Memory) 5 and a RAM (Random Access Memory) 6 that together constitute a storage section, and an interface 7.

The image reading section 1, the image feading printing section 2 and the image communication section 3 together constitute a document input and output section according to the present invention.

Figure 2:
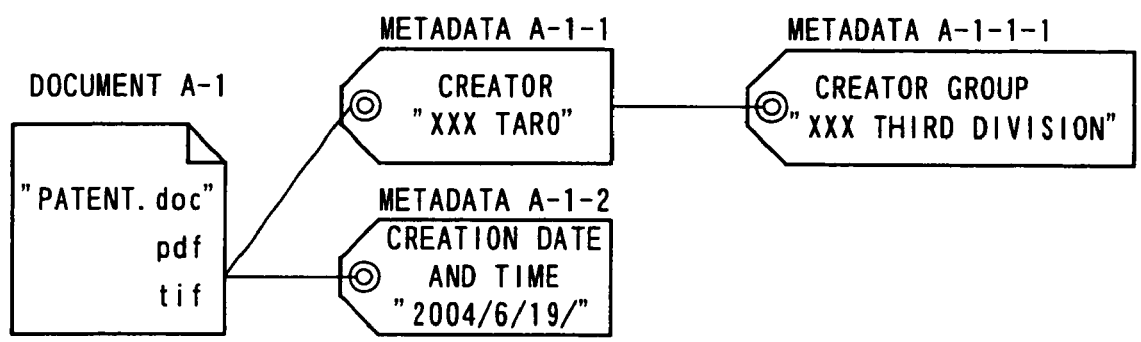
FIG. 2 is a view showing one example of a document and its metadata used in the embodiment.

FIG. 2 shows the basic configuration of document information to be processed in this embodiment, wherein the documents mean the instances of the documents, and include application document files, web pages, etc. In addition, the metadata are attributes accompanying the documents, as stated above, and include such attributes as [creators], [creation dates], and so on, having such values as "XXX Taro", "16:18, Jun. 19th, 2004", respectively. Depending upon the characteristic or property of the metadata, some of the metadata may has a dependency relation such as the one where once a [creator] is decided, an "XXX third division", being a [group to which the creator belongs], is accordingly decided.

Embodiment 1

Now, a first embodiment of the present invention will be described below in detail.

Figure 3:
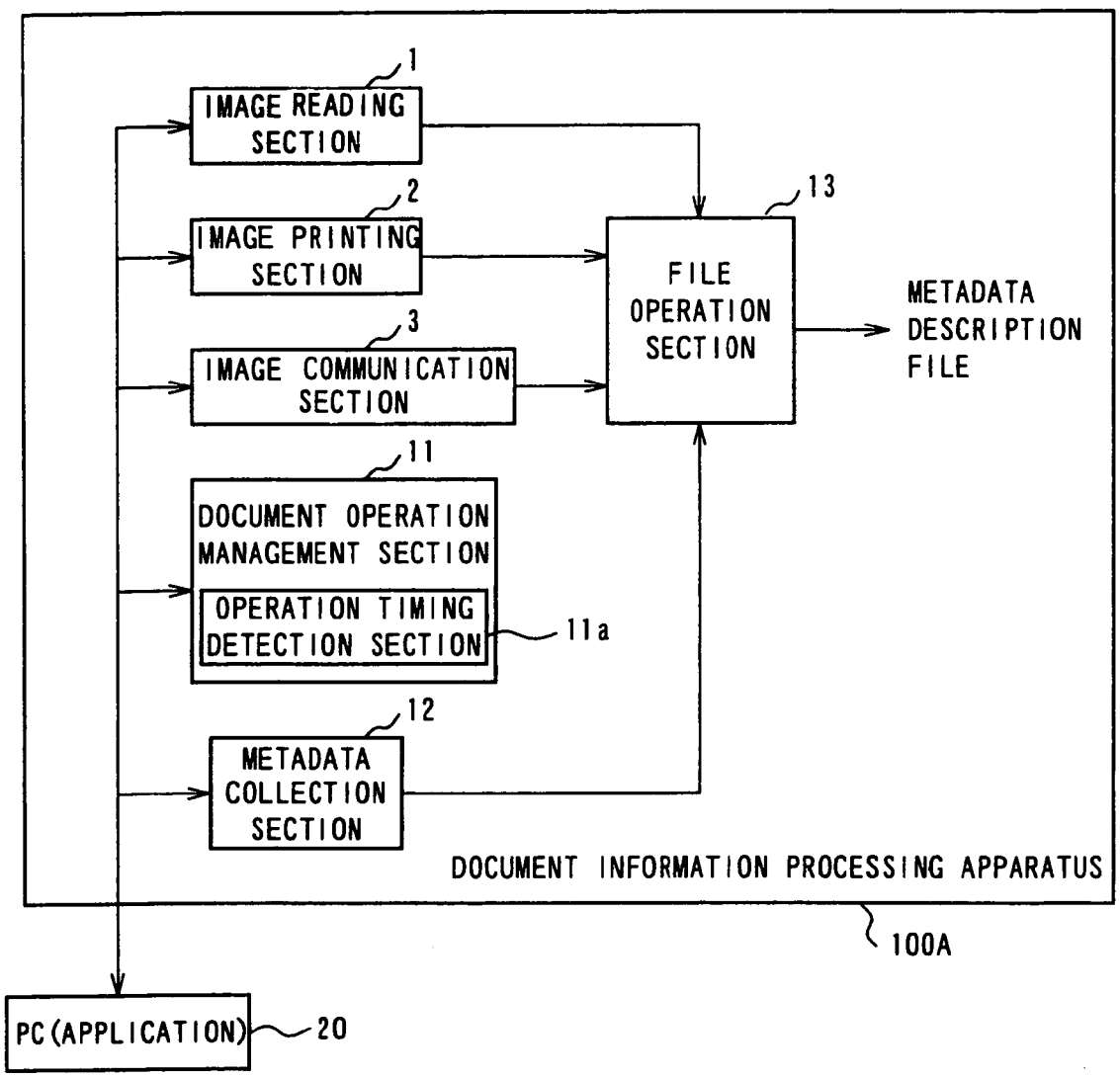
FIG. 3 is a functional block diagram showing a document information processing apparatus in the first embodiment.

FIG. 3 shows a functional block diagram in the first embodiment of the present invention. This functional block diagram is constituted, by way of example, by the basic configuration shown in FIG. 1.

A document information management apparatus 10A, as illustrated in FIG. 3, includes an image reading section 1, an image printing section 2 and an image communication section 3, and at the same time further includes: a document operation management section 11 that manages the time information on document operations, information on the state of the operation environment or the like by monitoring the operations or manipulations performed by document (image data) handling sections such as the image reading section 1, the image printing section 2, the image communication section 3, etc., or by receiving operation events of the document handling sections; a metadata collection section 12 (corresponding to a metadata acquisition section in the present invention) that recognizes and obtains (acquires) information on document operation managed in the document operation management section 11 as attribute information that pertains to the pertinent documents; and a file operation section 13 (corresponding to a metadata description section in the present invention) that converts the image data obtained by the image reading section 1 or the image communication section 3 into files of more versatile formats (PDF, etc.), and writes the metadata collected by the metadata collection section 12 into pertinent files thereby to create files each having a description of pertinent metadata.

Here, the document operation management section 11 can be constituted by a software module that monitors and manages time information on operations or manipulations of documents and/or information on the state of the operation or manipulation environment (operation or manipulation history) by monitoring scanning of documents, printing of documents from applications, transfer of fax documents received, and operations or manipulations of documents in the operation or manipulation environment of a document input and output part formed of a PC (personal computer) 20 (e.g., opening, saving or printing of document files, or sending or editing of e-mails by using applications on the PC), or by receiving operation or manipulation events. In addition, the document operation management section 11 constitutes an operation timing detection section 11*a* of the present invention.

The metadata collection section 12 collects information on the document operation managed in the document operation management section 11, and recognizes it as attribute information pertaining to the pertinent document. For example, the metadata collection section 12 can be constituted by a software module that serves to recognize, upon scanning of an image, a person "XXX Taro" having performed the scanning operation as a [creator] of a scan image file.

DESCRIPTION OF THE OPERATION

Hereinafter, reference will be made, as one example of the operation of the first embodiment, to the case where a document scanned by a scanner (the image reading section 1) is converted into a document file, and metadata of the [creator] and the [creation date and time] are written or described into the document instance thus created, while referring to a flow chart of FIG. 4.

When a document reading process is started (step S1-1), the image reading section 1 has a mechanism that accepts an instruction from a user. For example, a GUI for user operation is displayed on a touch panel of a copier so as to wait for an instruction from the user (step S1-2), whereby the start of the document reading process and parameters for reading can be set by user's operation. Here, it is assumed that the user first logs in for authentication processing by using the touch panel in order to perform the document reading process. The user can log in by inputting the user's own name and a password for authentication, and thereafter perform operations for starting the document reading process and setting parameters. At this time, the image reading section 1 receives the user name and the password from the user for authentication (step S1-3), and determines based on the information whether the login is permitted. The document operation management section 11 detects that the login has been made in the image reading section 1 so as to read the document that is, a predetermined operation for the input/output of the document has been performed)(step S1-4).

The metadata collection section 12 determines that the user who has made this login is "the creator of the document instance created by this reading". Upon receipt of an event that the authentication processing has been detected from the document operation management section 11, the metadata collection section 12 collects information such as the user name, the password, etc., by applying a rule determining that the password of the user who performed this login is "the password of the creator of the document instance created by this reading" (step S1-5). The information collected here is once stored or kept temporally so as to describe the document instance at a later time. For such storage,there can be used a temporal data area in a memory used by the metadata collection section 12 or a file on the file system that is a working area for converting the read image into the document instance.

When the user authentication and the setting of the parameters for reading or the like are completed, the user actually instructs the start of reading the document. According to this instruction, the image reading section 1 sequentially reads in sheets of the document on an automatic carriage or sheet feeder of the copier by means of a scanner for example and acquires them as image data (step S1-6). At this time, the document operation management section 11 detects that the document reading process has been performed in the image reading section 1 (step S1-7). Upon receipt of an event that the reading processing has been performed from the document operation management section 11, the metadata collection section 12 collects the date and time at that time by applying a rule that determines that the date and time at which this login is started is "the creation date and time of the document instance created by this reading" (step S1-8).

The information collected here is temporally kept or stored in the metadata collection section 12, as in the information on the [creator] and the [creator password].

The image data read by the image reading section 1 is passed to the file operation section 13 and converted there into a file of the document instance of a format to be created. Here, the metadata collected from the metadata collection section 12 during the document reading operation is passed to the file operation section 13. The file operation section 13 creates, from the image data and the metadata, the file with a form complied with the target format to be created writes or describe the metadata into the file (step S1-9), and thereafter completes the processing (step S1-10).

Here, note that in the description of the metadata in step S1-9, if the object whose metadata is to be described is a file of PDF format for example, the image data is described as a stream object for each page read of the document, and the metadata is further described in RDF format and written into the PDF format as an XML stream object of versatile XMP format for each page.

Thus, the metadata such as [creator], [creator password], [creation date and time], etc., for the image data thus read in by the scanner can be embedded in the document instance and set as attributes of the document file. Here, although reference has been made to an example in which the image reading section 1 (e.g., a scanner) is used as the document input and output section, it is possible to use even the image data received by the image communication section 3 (e.g., a Fax machine) as an image input. The metadata to be collected can vary depending upon different input sources. For example, if an input source is image data received by a Fax machine, the name of its Fax sender can be collected as a [sender name], or if it is an image data file attached to an e-mail received, the e-mail address of its sender can be collected as a [sender address].

In cases where the metadata thus collected is written or described into the document instance, tags of XML described in RDF for example can be defined on the apparatus or system, in accordance with which the metadata can be embedded in the document instance.

Figure 5:
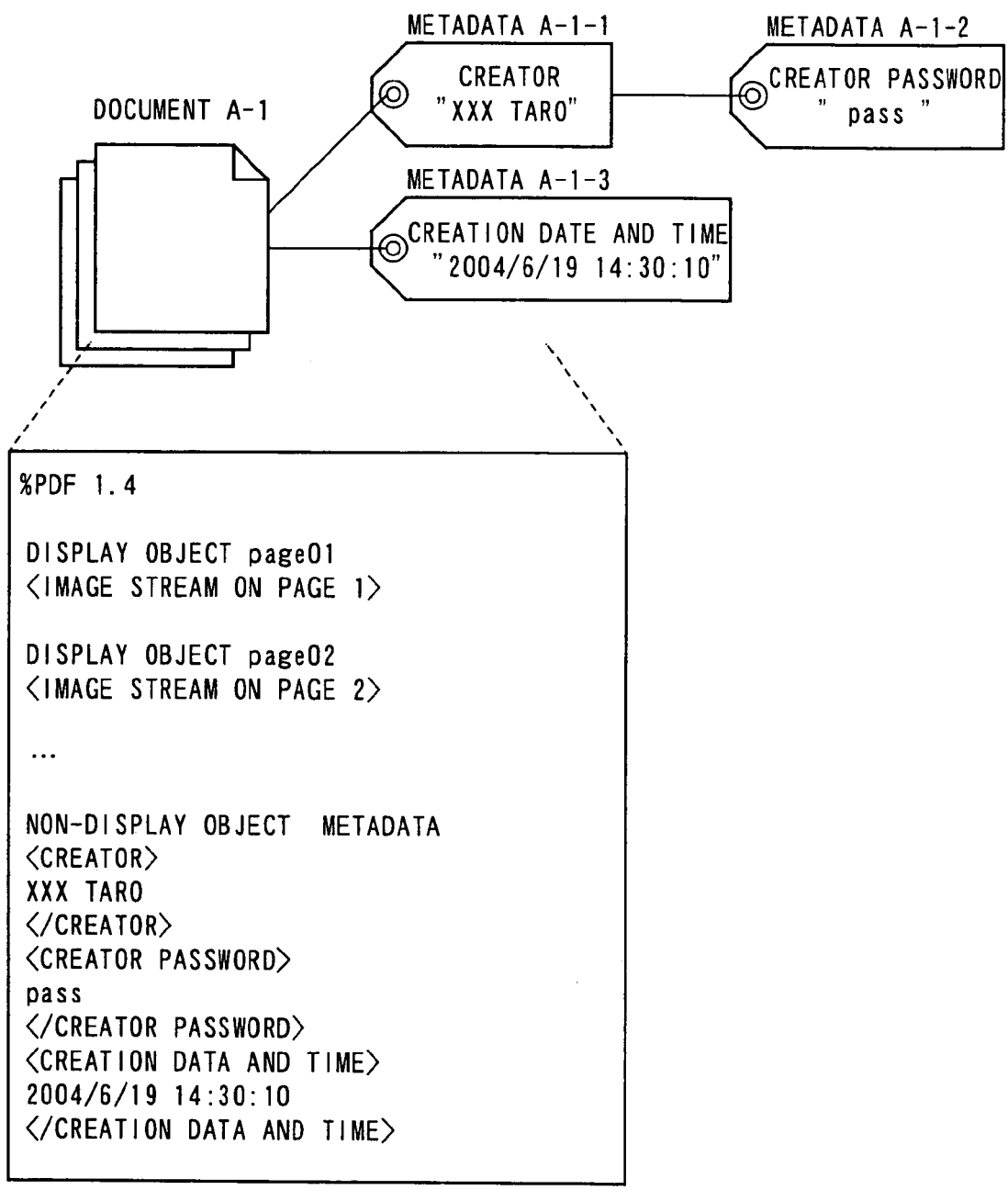
FIG. 5 is a view conceptually showing a document obtained in the first embodiment.

The document instance created in this manner is illustrated in FIG. 5. For example, when the read image is converted into a PDF file, it is written or described into the file as a block to identify its format, or a block of stream data with the image attached to a page, or a block that is not displayed with viewers such as Acrobat Reader (registered trademark) but embedded in the file as data. An image on each page of the read document is described in an image stream as one page of the PDF file, such being repeated for the number of pages read. The metadata thus collected are described as an XML stream for a data area which is not displayed as an image.

Here, the name, "XXX Taro", of the user who logged in for document reading is given as a value for the [creator]; the password, "pass", of the user who logged in for document reading is given as a value for the [creator password]; and the date and time, "2004/6/19 14:30:10", at which the reading process was performed, is given as a value for the [creation date and time]. In the case of important values such as a password from the standpoint of security, they can be described through encryption.

Embodiment 2

Figure 6:
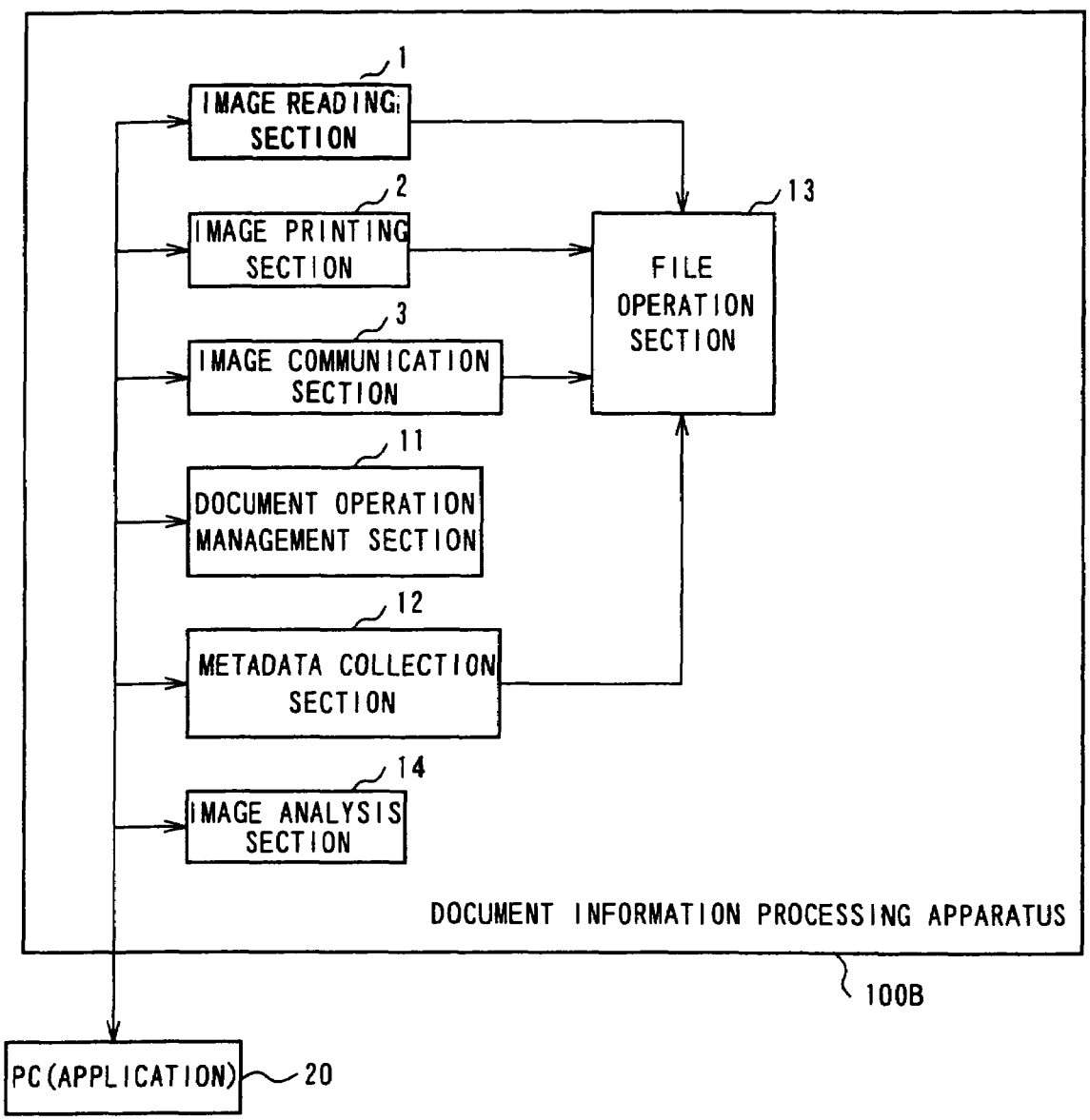
FIG. 6 is a functional block diagram showing a document information processing apparatus according to a second embodiment of the present invention.

FIG. 6 is a functional block diagram that illustrates a second embodiment of the present invention. In a document information processing apparatus 100B according to the second embodiment, provision is made for an image analysis section 14 in addition to the functional blocks of the first embodiment shown in FIG. 3. By analyzing an image file (JPEG, bitmap, etc.), this image analysis section 14 acquires layout information such as diagram areas, text or character areas, etc., contained in its contents, and further performs the reading of text information in the areas that are recognized as the text or character areas by using an optical character reader or the like. The image analysis section 14 can be constituted by a software module that serves to acquire diagram information, color information and text information that are contained in the contents of pertinent images.

DESCRIPTION OF THE OPERATION

Figure 7:
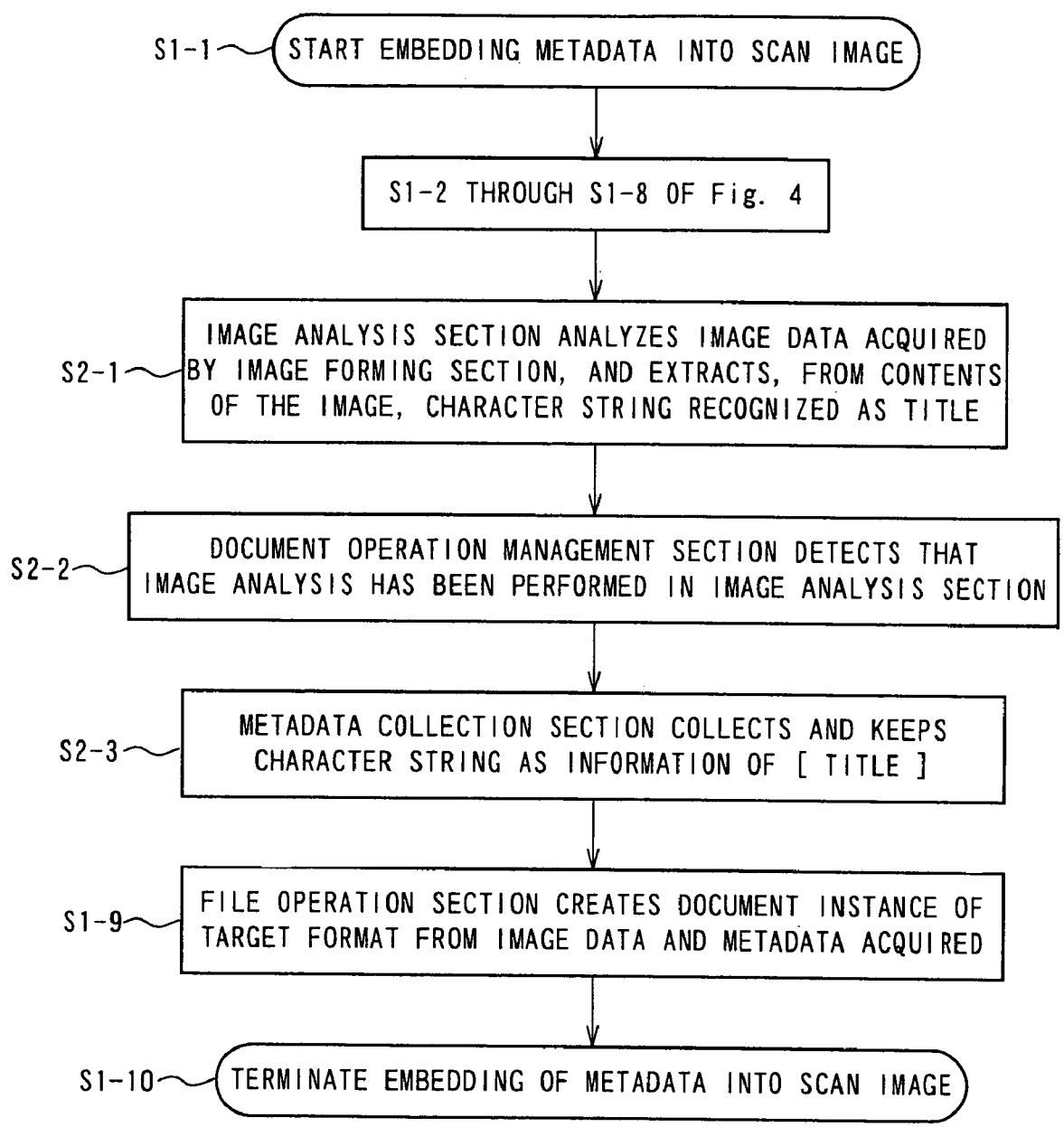
FIG. 7 is a flow chart showing the operation of the second embodiment.

Hereinafter, reference will be made, as one example of the operation of the second embodiment, to the case where a document read by a scanner is converted into a document file, and the [title] of the contents of images is further extracted by analyzing the image data acquired, and metadata for the [title] is additionally embedded into the document instance thus created, while using a flow chart of FIG. 7. Here, note that operations in step S1-1 through step S1-8 in FIG. 7 are the same as those shown in FIG. 4 in the first embodiment, and hence an explanation thereof is omitted here.

First of all, an image analysis section 14 makes analysis on the image data acquired by the image reading section 1. For example, a layout analysis is first performed with respect to the image data, so that portions corresponding to the diagram areas and portions corresponding to text areas are recognized from page images of the document. In general, it is considered that a text or character area located in an upper center in the image of the first page is an important portion such as the [title], a topic, a caption or heading of the document. In accordance with such a determination rule, the image analysis section 14 performs OCR processing with respect to the pertinent portion having been subjected to the layout analysis to extract text or character information (step S2-1). At this time, the document operation management section 11 detects that an image analysis has been performed in the image analysis section 14 (step S2-2).

Upon receipt of an event that an image analysis has been performed from the document operation management section 11, the metadata collection section 12 collects the text or character information by applying a rule that determines that the character string in the portion which is recognized as the [title] of the document thus read is the [title] of the document instance created by this reading (step S2-3). The metadata thus obtained is described and embedded into the document instance, similar to the first embodiment (step S1-9), and the processing is then ended (step S1-10).

Figure 8:
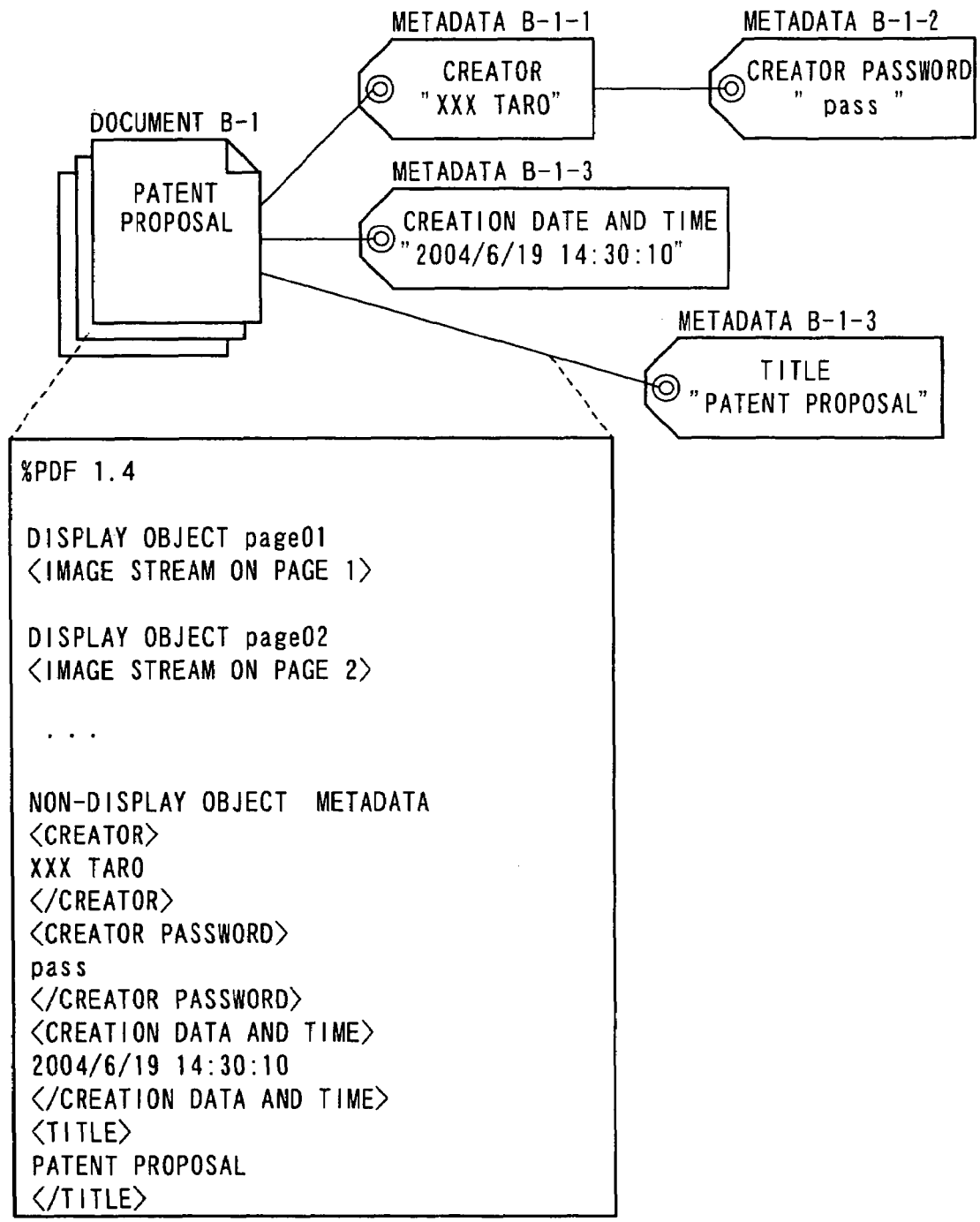
FIG. 8 is a view conceptually showing a document obtained in the second embodiment.

The document instance created in this manner is illustrated in FIG. 8. When a description of "Patent Proposal" is made in the upper center on the first page of the image read for example, the layout of the text area corresponding to the description is analyzed and the description is extracted as character string information by means of OCR. The character string "Patent Proposal" thus extracted by OCR is given as a value for the [title] of the data area for the metadata of the document instance.

Embodiment 3

Figure 9:
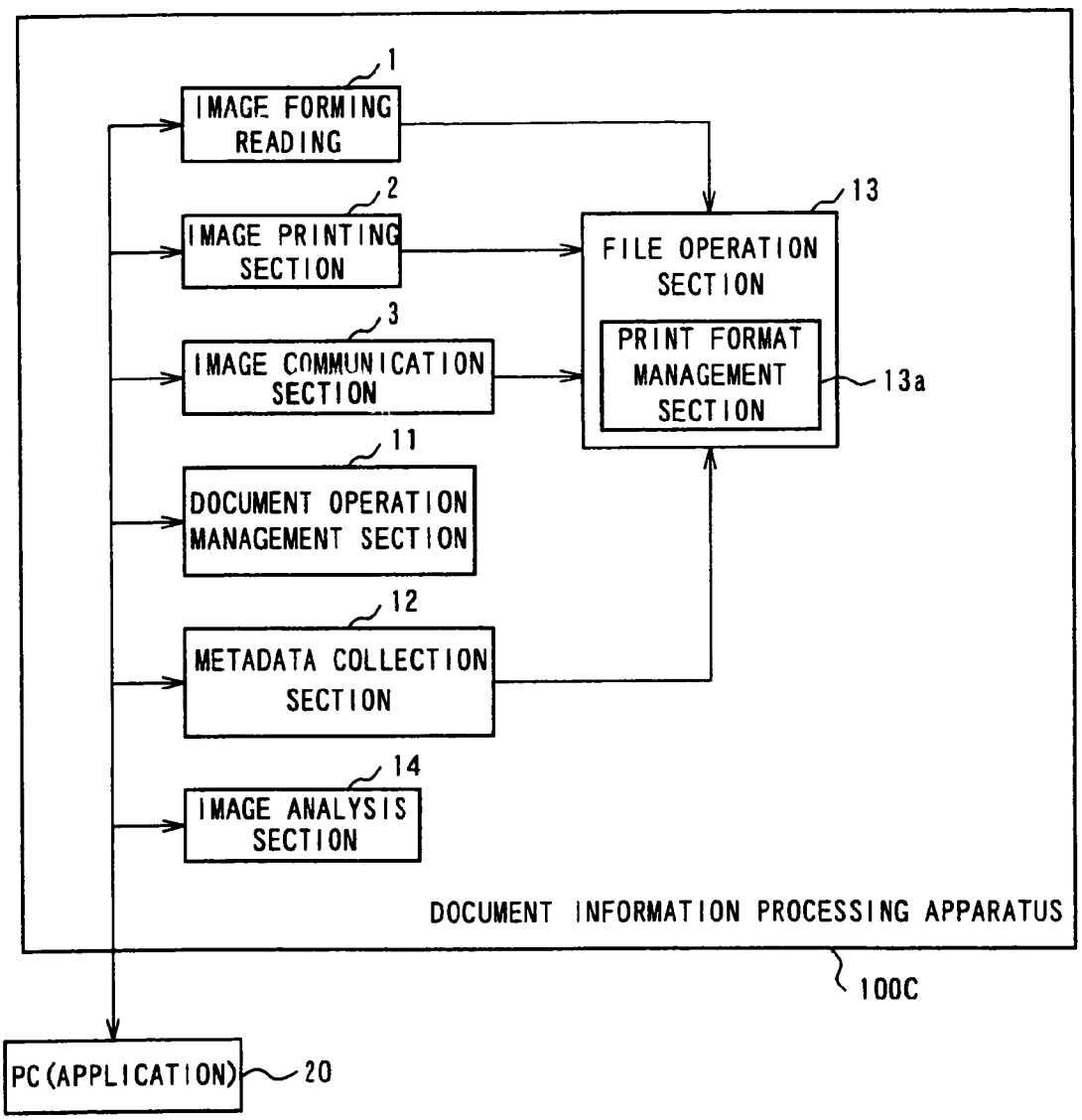
FIG. 9 is a functional block diagram showing a document information processing apparatus according to a third embodiment of the present invention.

FIG. 9 is a functional block diagram that illustrates a third embodiment of the present invention. In a document information processing apparatus 100B according to the third embodiment, provision is made for a print format management section 13a in addition to the functional blocks of the second embodiment shown in FIG. 6. This print format management section 13a can be constituted, for example, by a software module that serves to manage image data to be printed as data of a format such as bitmap into which the image data is converted so as to be able to be printed by the image printing section 2 when an instruction for printing the image data of a document scanned or the image data read upon copying a document is given by an application through a printer driver. The data of the pertinent format is held in a file of a print format or the like, so that it can be printed by the image printing section 2 according to the request of the user. Although the print format management section 13a is constituted by the file operation section 13 in FIG. 9, it is needless to say that the print format management section 13a can be provided separately from and independently of the file operation section 13.

DESCRIPTION OF THE OPERATION

Hereinafter, reference will be made, as one example of the operation of the third embodiment, to the case where the user issues a print request from a PC application through a printer driver so that a file of a print format is printed on paper by the image printing section 2, and at the same time held by the print format management section 13a.

If a request for reprinting will be made from the user at a later time, a pertinent file can be selected from among files of print formats held by the print format management section 13a so that it can be printed on paper by the image printing section 2. Information such as a situation (hereinafter referred to as context information upon issuance of a print request from an application is usually discarded when an image data or the like is sent to the image printing section 2, and it is not often managed even by a print format holding module such as the print format management section 13a, etc. Also, a part of the context information is acquired even by a printer driver or the like, but it is still discarded and is not managed in many cases. Thus, a flow chart of FIG. 10 illustrates the case where a document file for which a print request is made by an application is converted into a print format, and context information acquired by the application or a printer driver is collected as metadata, so that the metadata thus collected is embedded into a document instance managed by the print format management section 13a.

Figure 10:
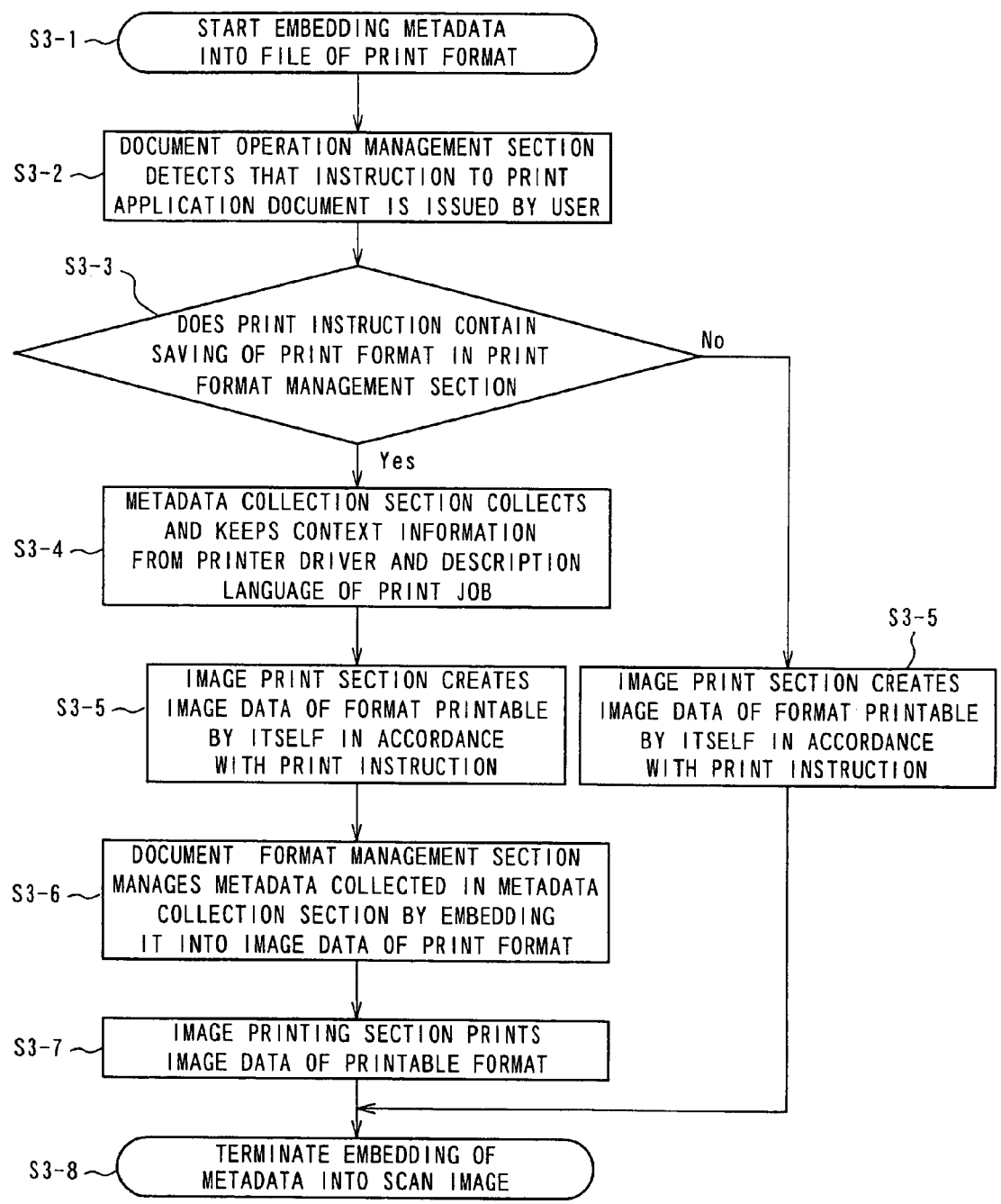
FIG. 10 is a flow chart showing the operation of the third embodiment.

In FIG. 10, the user instructs that an application document operated or manipulated by a PC application 20 is printed by the image printing section 2. At this time, the user can give an instruction that image data for the document to be printed should be held at the same time by the print format management section 13a as image data of a print format, so that it is possible for the user to instruct the reprinting of a pertinent document in an easy manner.

Based on the timing of the above user
s operation, the process of writing the metadata into a print format file is started (step S3-1). First of all, the document operation management section 11 detects that the user has instructed the printing of the application document with respect to the image printing section 2 (step S3-2). In addition, the document operation management section 11 determines from the content of the instruction at this time whether the image data is held and managed by the print format management section 13a as the image data of the print format or is only printed on paper simply by the image printing section 2 (step S3-3). In this case, when it is instructed that the image data is managed by the print format management section 13a, the metadata collection section 12 starts collecting the metadata concerning this print instruction.

The metadata collection section 12 collects, as context information on the application at this time, the name of the application, the path name in the file system where the application document is saved or stored, and so on. Moreover, information on the name of a personal computer on which the PC application 20 operates (e.g., the name of a machine managed on an OS in the case of Windows), its network IP address and so on is further collected from the printer driver. These pieces of information can be intentionally collected by the metadata collection section 12 or can be described in a print job description language (PostScript, PCL, etc.) that is sent to the image printing section 2 according to the print instruction. The metadata collection section 12 collects, as metadata, context information that can be acquired in accordance with these situations step S3-4).

The image printing section 2 creates image data of a print format that can be printed by itself, by analyzing the print job description language that has been sent thereto (step S3-5). The print format management section 13a writes or describes the metadata collected by the metadata collection section 12 into the file of the printable format, and manages the document instance therein (step S3-6). The image printing section 2 performs printing by using the image data of the print format (step S3-7), and then terminates the processing (step S3-8).

In this example, reference has been made to the case where an instruction to manage the image data of the print format by the print format management section 13a is provided along with a print instruction given to the image printing section 2, but in some cases, the user can give an instruction that the image data of the print format is simply managed by the print format management section 13a, without performing printing in the image printing section 2. On the other hand, there are cases where input image data can be converted into a printable format, held and managed by the print format management section 13a, that is, the image data read by the image reading section 1 (including the purpose of copying the document, etc.) is managed in a print format by the print format management section 13a, or the image data received by the image communication section 3 is managed in a print format by the print format management section 13a. In these cases, the metadata collected by the metadata collection section 12 become those which are shown in the first or second embodiment, and they are described and embedded into the document instance.

Figure 11:
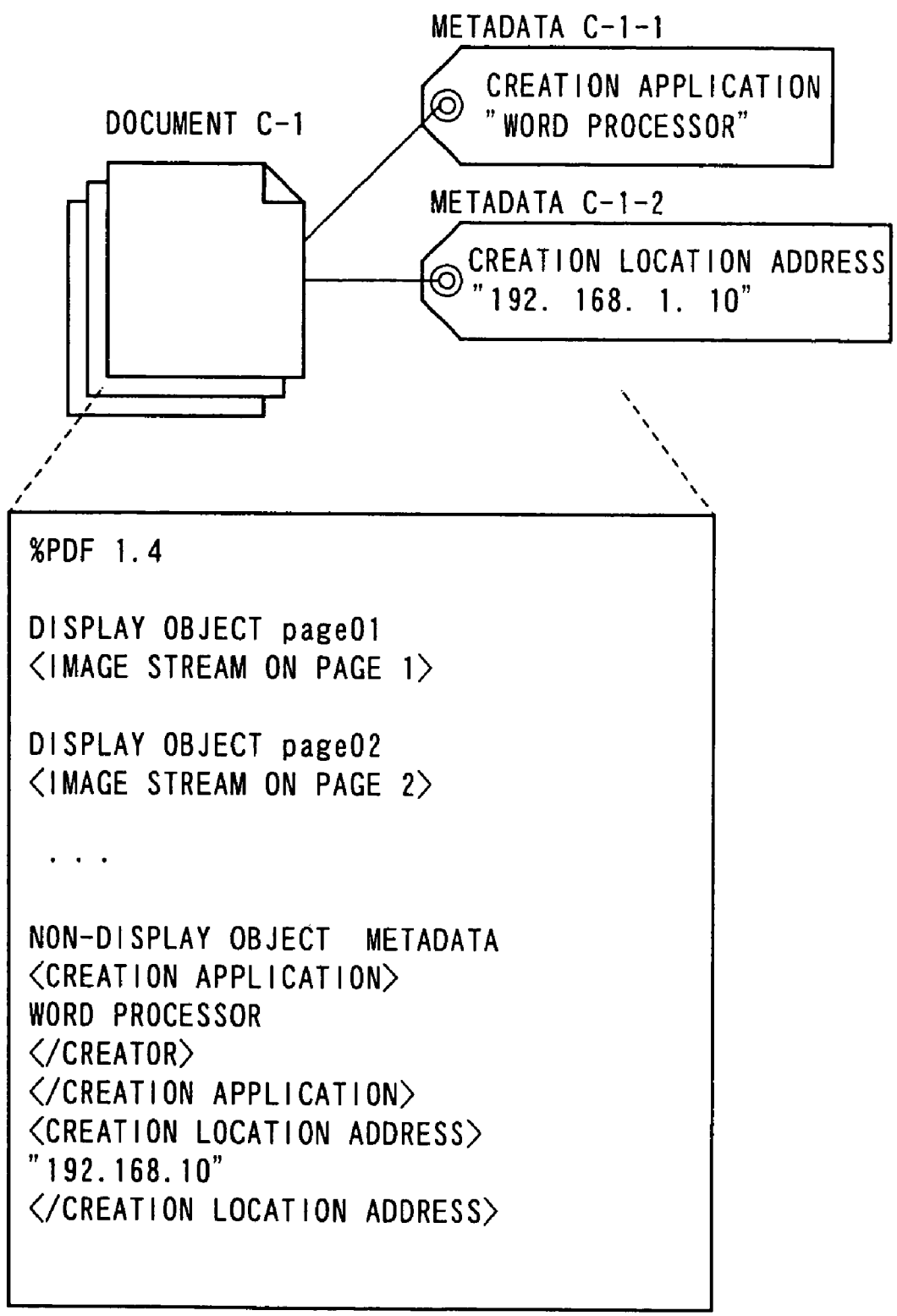
FIG. 11 is a view conceptually showing a document obtained in the third embodiment.

The document instance created in this manner is illustrated in FIG. 11. For example, by monitoring an environment (the desktop of an OS, etc.) in which the user controls the PC application 20, the document operation management section 11 detects that a print instruction has been given by a pertinent application. Then, the metadata collection section 12 collects as metadata the name of the pertinent application (it can be registered in advance, or it can be extracted from the name attached to a window on the desktop of the OS).

Embodiment 4

Figure 12:
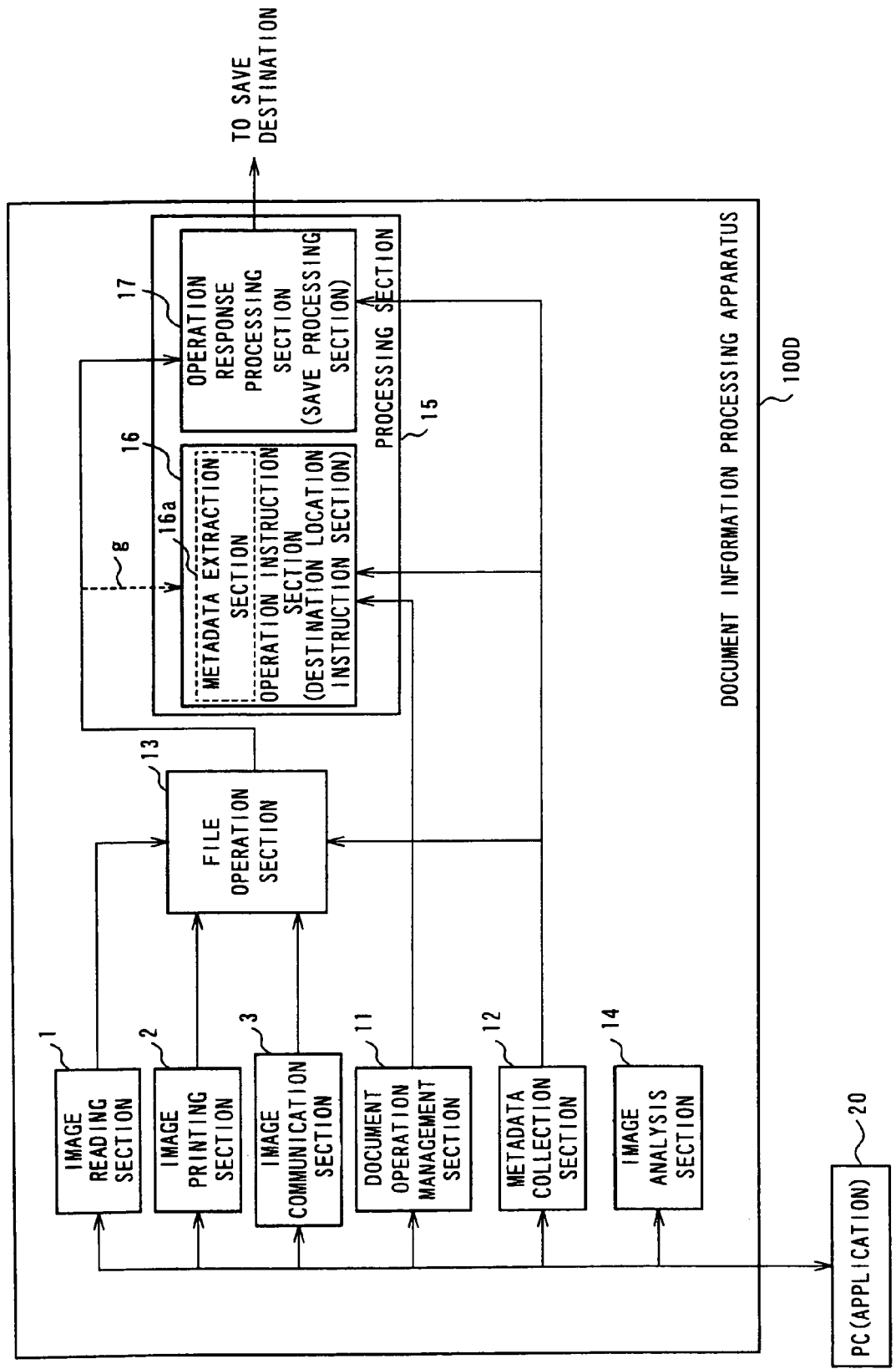
FIG. 12 is a functional block diagram showing a document information processing apparatus according to a fourth embodiment of the present invention.

FIG. 12 is a functional block diagram that illustrates a fourth embodiment of the present invention. In a document information processing apparatus 100D according to the fourth embodiment, provision is made for a processing section 15 in addition to the functional blocks of the second-embodiment shown in FIG. 6. This processing section 15 is constructed to include an operation instruction section (destination location instruction section) 16 that instructs the destination location of the document object, and an operation response processing section (save processing section) 17 that performs save processing as a response based on an instruction from the operation instruction section 16. Here, note that the operation instruction section 16 can be constituted by a software module that provides instructions for more detailed operations based on the metadata added by the operation to the document. Also, the operation response processing section 17 can be constituted by a software module that acquires information on the location or arrangement of the document instance (e.g., a folder path on the file system, the name of a cabinet in which the document instance is kept or stored on the document management system, etc.) from among the instructions for the operations or manipulations to the document, and determines or identifies information on the destination of location or arrangement of the document instance (e.g., the size of remaining area in which the document instance can be saved or stored, compressed format or not, the presence or absence of limitations such as an access right, etc.).

DESCRIPTION OF THE OPERATION

Figure 13:
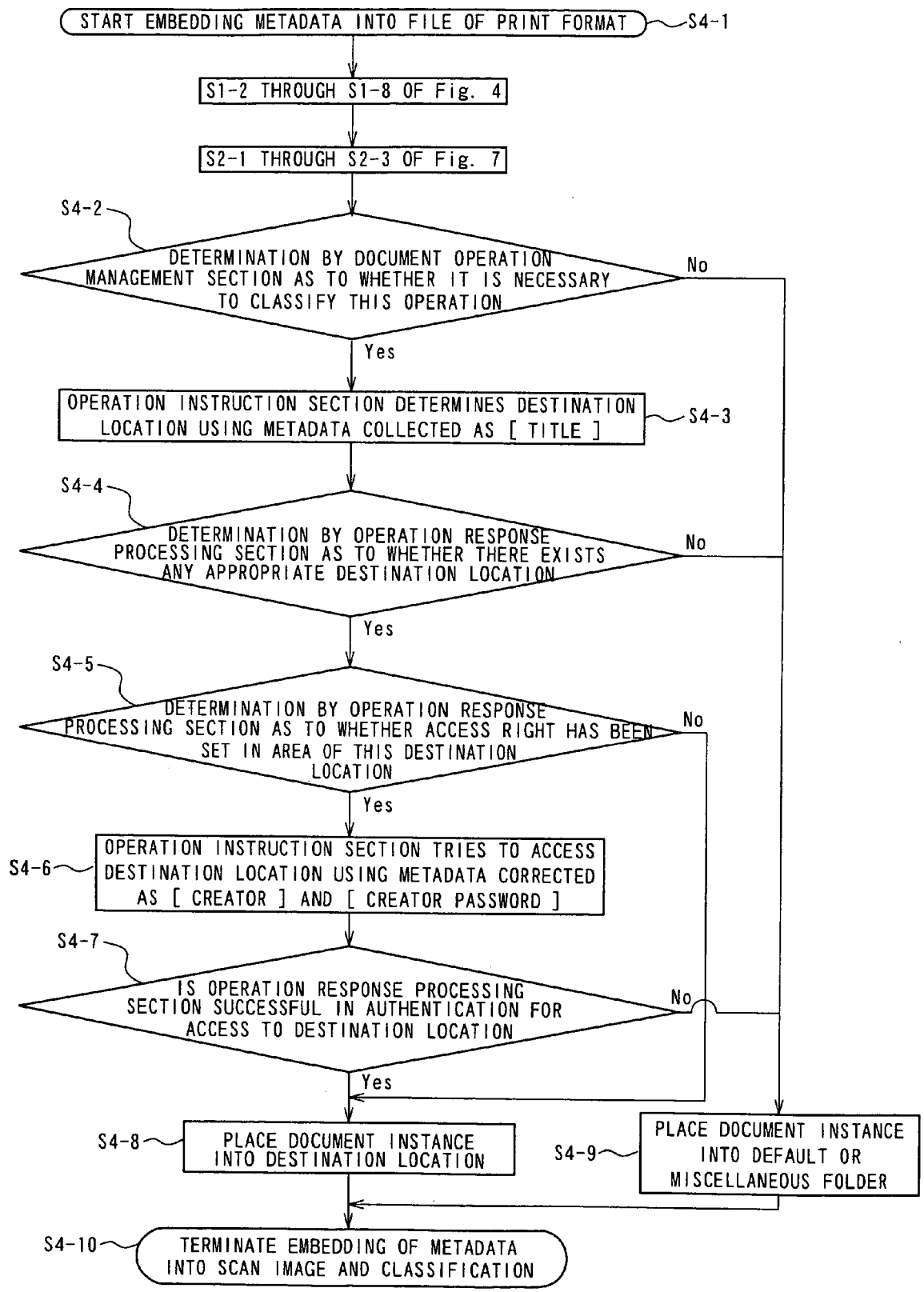
FIG. 13 is a flow chart showing the operation of the fourth embodiment.

Hereinafter, reference will be made, as one example of the operation of the fourth embodiment, to the case where though only a relatively simple instruction, "scan and classify", is given as an operation of the document, the operation instruction section 16 instructs a detailed operation of identifying or determining the destination of location or arrangement of the document instance, and automatically placing or arranging the document instance there by analyzing the image of the document by means of the image analysis section 14 or the like, and an access right for each user is set in the area of the destination location by means of the operation response processing section 17, so that the document instance can be placed or arranged only when saving thereof is authenticated, which referring to a flow chart of FIG. 13.

Here, it is assumed that in the image reading section 1, the user has issued an instruction to the effect "The document is scanned and the document instance is automatically classified from its content", and that the document operation management section 11 grasps that such an operation is being carried out. The operations from the start of the processing (step S4-1) to steps S1-2 through S1-8 being initially carried out as well as those from step S2-1 to step S2-3 are the same as those in the first embodiment and in the second embodiment, respectively, and hence an explanation thereof is omitted here.

In step S4-2, the document operation management section 11 grasps that the above operation of the user is for "automatic classification", and hence it gives an instruction to the operation instruction section 16 so as to make use of the character string of the [title] obtained through analysis.

The operation instruction section 16 determines the destination of location or arrangement of the document instance (e.g., "patent folder") according to the character string "Patent Proposal" that is the value of the metadata already collected as a [title] (step S4-3). When there exists no appropriate destination of location that matches this character string (step S4-4), the operation response processing section 17 places or put the document instance into a destination location set by default (e.g., a place or location such as a miscellaneous folder into which the document instance is put when no appropriate destination has been found because there was no match, or authentication was unable to be made, or other like reasons step S4-9).

Figure 14:
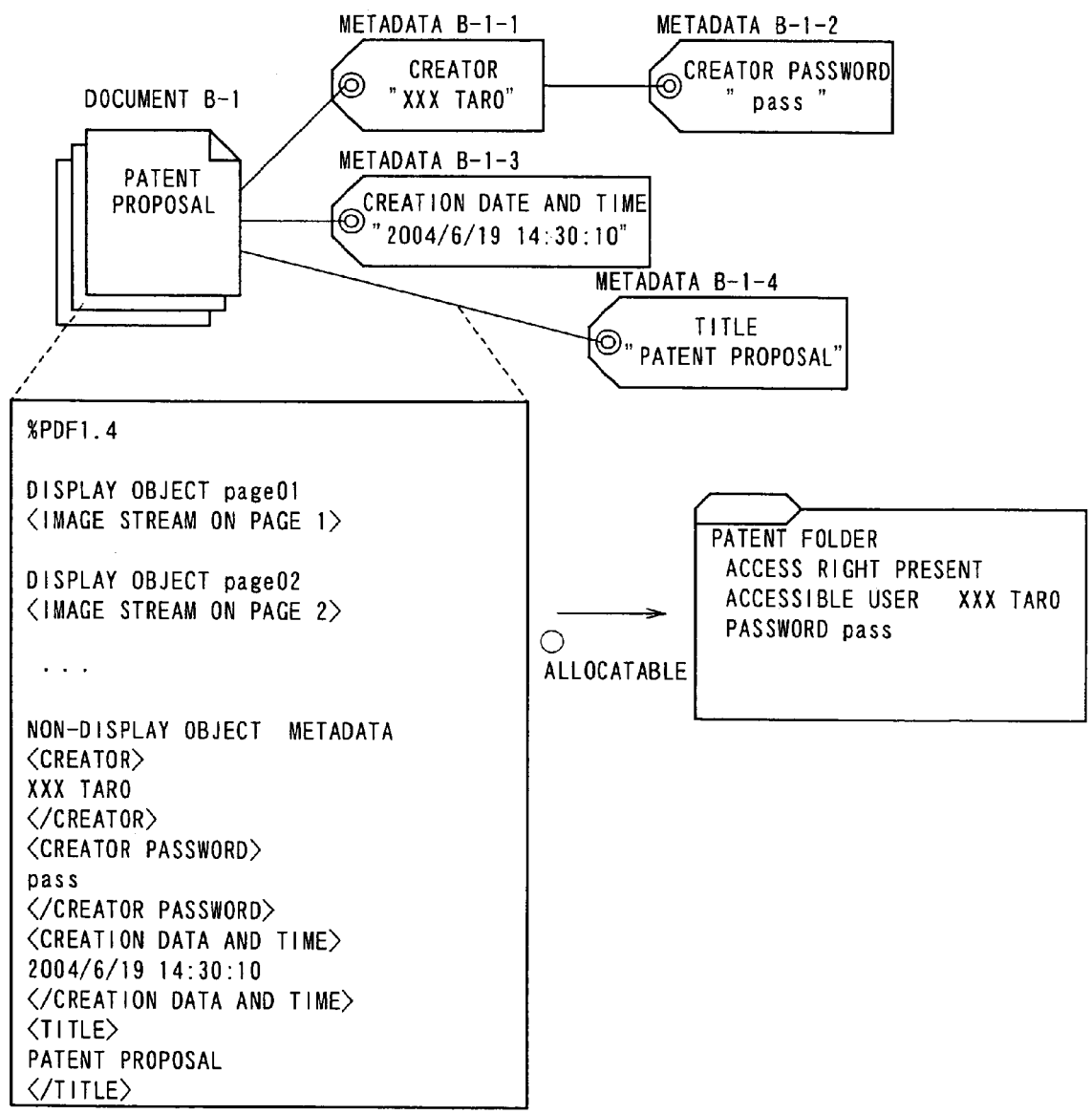
FIG. 14 is a view conceptually showing one example of a document obtained in the fourth embodiment.

The operation response processing section 17 acquires information with respect to the destination of location determined by the operation instruction section 16. Here, it is determined whether an access right is set to the "patent folder" (step S4-5). If not set, the pertinent document instance is placed or put into the "patent folder" as it is, whereas if the access right is set, the operation response processing section 17 attempts to perform authentication by using the metadata, the [creator] and the "creator password", which have already been collected (step S4-6). When the authentication is successful (step S4-7), it is determined that access can be made to the destination of location, so the document instance is placed or put there (step S4-8). In this case, the document instance and the destination location are conceptually shown in FIG. 14.

When the authentication fails, however, the document instance is put into the default "miscellaneous folder" (step S4-9). If "classification" need not be done at all in step S4-2, the document instance is put into the default "miscellaneous folder".

In the above cases, the operation instruction section 16 may use the character string of "Patent Proposal", the value of the metadata on the memory, which is acquired by the image analysis section 14 or the metadata collection section 12 for its processing. In addition, in cases where what has once been substantiated or made into a document instance, provision may be made for a metadata extraction section 16a in the operation instruction section, for example, as shown by the dotted line in FIG. 12, so that the content of the metadata described in the document instance can be extracted so as to acquire and use a character string which is the value of the content.

In the latter case, it is possible to perform more detailed operations (classification, setting of the compression ratio, changing of the typography or print appearance, etc.) on the entire document instance as a process separate from the processing that scans and classifies the document by means of the image reading section 1 as mentioned above.

Figure 15:
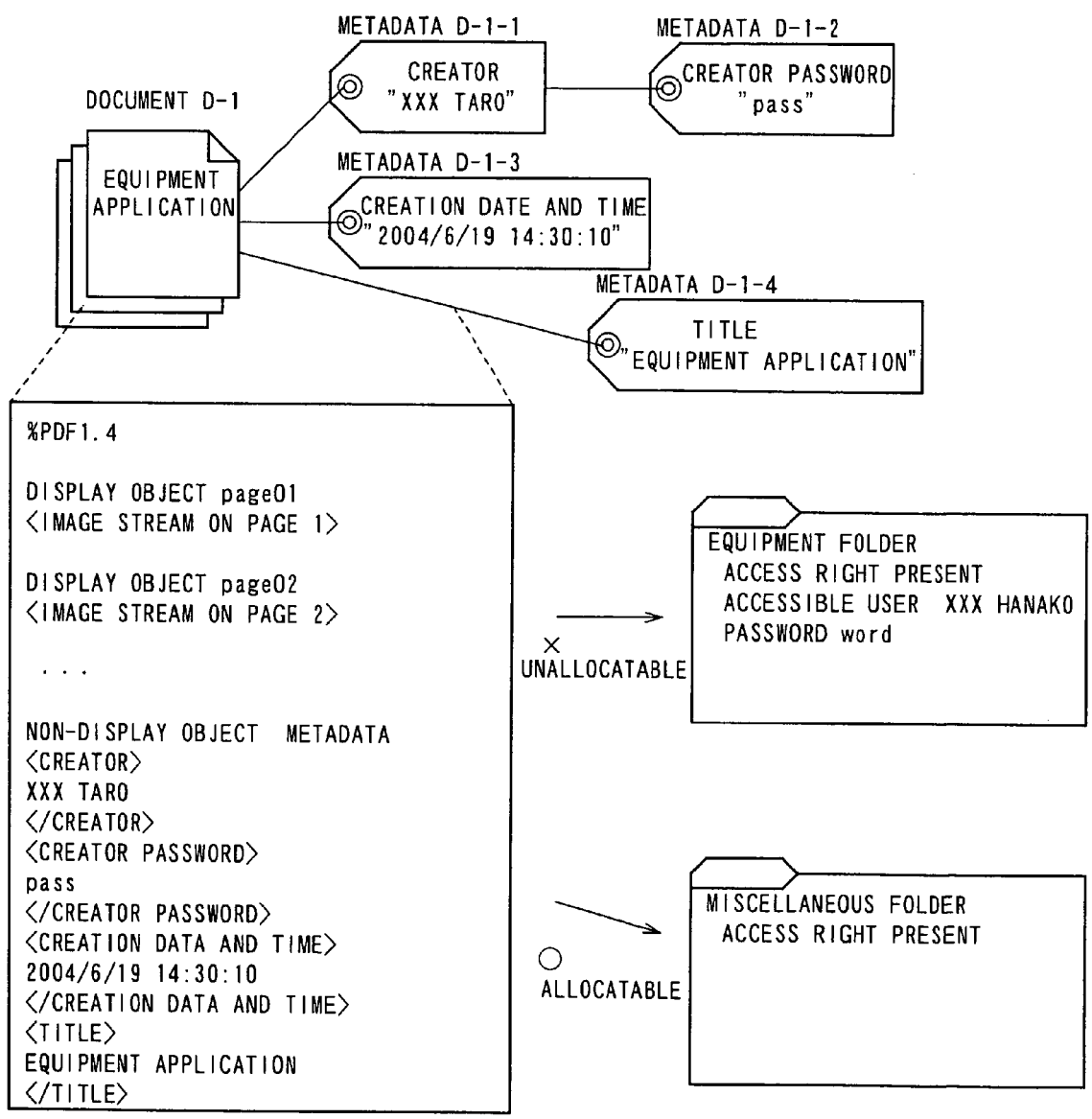
FIG. 15 is a view conceptually showing another example of a document obtained in the fourth embodiment.

The document instance thus created and the destination of location thereof are illustrated in FIG. 15. For example, even if it is determined that a document with a [title] recognized as "Equipment Application" is to be placed into an "equipment folder", the authentication for access will not actually be passed against that folder with the use of a user name "XXX Taro" and a password "pass", so this document instance is put into the "miscellaneous folder".

Embodiment 5

Hereinafter, reference will be made, as a fifth embodiment of the present invention, to one exemplary case where created document instances are managed and made use of for a certain purpose (here, the purpose of "searching for those which meet a certain condition from among the document instances"), and they can also be used in a plurality of apparatuses and a plurality of systems being operated. The fifth embodiment describes one example of services in a document instance management section that manages the instances of the documents. Though in the document instance management section, the document instances are managed so as to provide services such as their search, categorization, recommendation and the like to users, reference will be made herein to the case where a search is made for a document by means of the document management section, particularly using predetermined metadata.

Figure 16:
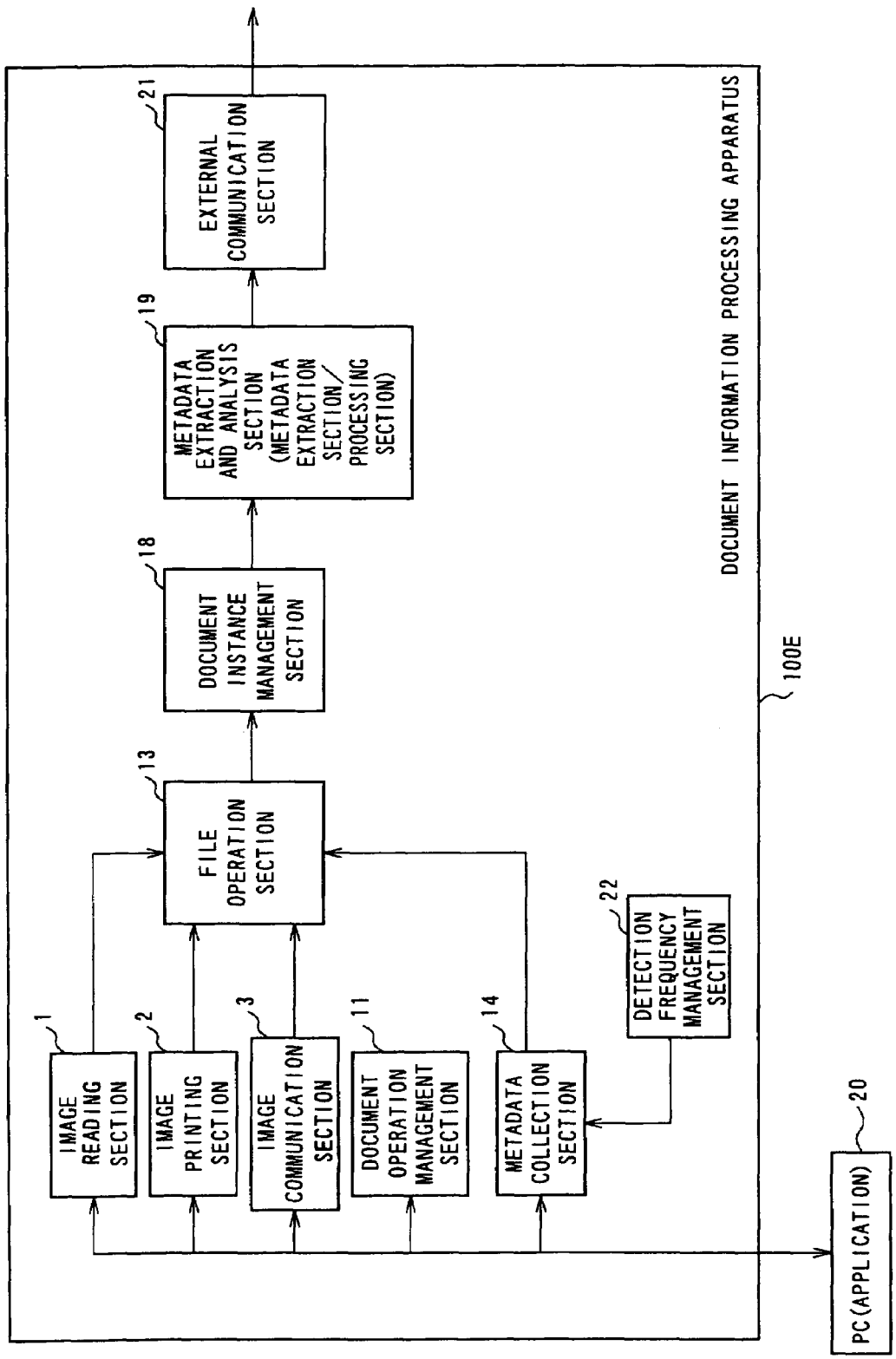
FIG. 16 is a functional block diagram showing a document information processing apparatus according to a fifth embodiment of the present invention.

FIG. 16 is a functional block diagram that illustrates a fifth embodiment of the present invention. A document information processing apparatus 100E according to the fifth embodiment includes, in addition to the configuration shown in the first embodiment of FIG. 3, a document instance management section 18, a metadata extraction and analysis section (metadata extraction and processing section) 19 having functions in the form of a metadata extraction section and a processing section, an external communication section 21, and a search frequency management section 22 that manages the frequency of searches. The file operation section 13 is constructed so as to write or describe the search frequency managed by the search frequency management section 22 into the metadata extracted by the metadata extraction and analysis section.

The metadata extraction and analysis section 19 can be constituted by a software module that extracts pieces of metadata and their values by reading from a document instance the metadata embedded therein and analyzing their contents.

Here, note that the document instance management section 18 can also be constituted by a software module that manages operations such as searching, editing, copying, deletion, etc., with respect to the document instance having the metadata embedded and described therein.

Figure 17:
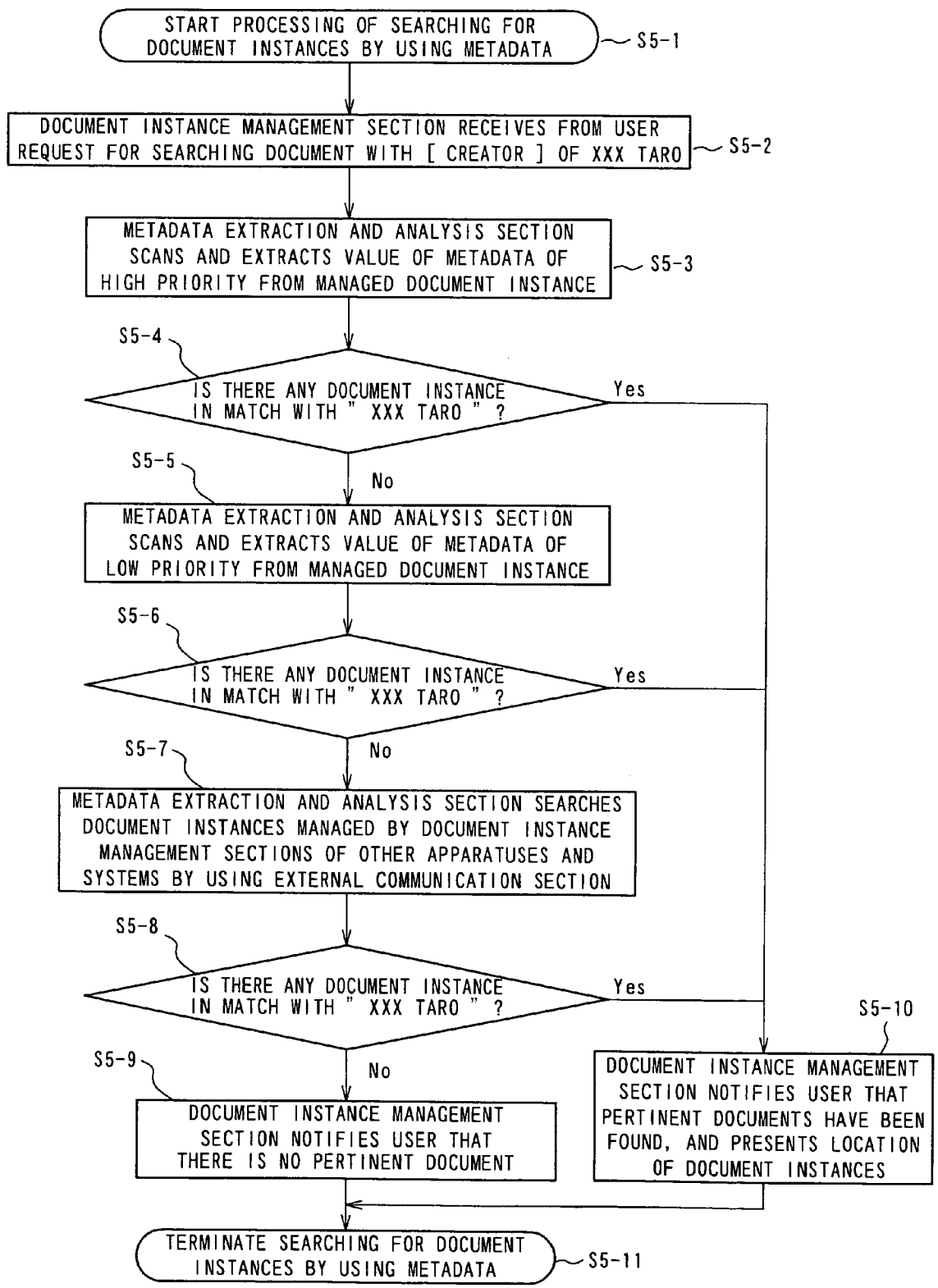
FIG. 17 is a flow chart showing the operation of the fifth embodiment.

Next, reference will be made to the operation of the fifth embodiment of the present invention while using a flow chart shown in FIG. 17.

First, the user starts the operation of this embodiment by instructing a search for document instances with a [creator] of "XXX Taro" to the document instance management section 18 (step S5-1), and the document instance management section 18 receives the request of the user (step S5-2). Here, it is assumed that the value, "XXX Taro", of a piece of metadata [creator] is internally described in a document instance as a search object of low priority. The priority of such a search object is determined, for example, in accordance with the frequency at which the object is searched for. In this document information processing apparatus 100E, searches are frequently made for [title] and [creation application], but not for [creator]. Also, with respect to [creator], searches are frequently made for "XXX Hanako", but for "XXX Taro". In such a case, when pieces of metadata are written or described into the document instances by the search frequency management section 22, metadata with low frequencies are decided to be low in priority at the time of searching, and are described accordingly.

The metadata extraction and analysis section 19 reads metadata of higher priority and extracts their values (step S5-3), and makes comparisons therebetween so as to find anyone that matches the designated value, "XXX Taro" (step S5-4). Here, the metadata in the form of "XXX Taro" is set to a low frequency and is accordingly described, so no match is made to this metadata in searches for metadata of high priority (step S5-4, No). Accordingly, the metadata extraction and analysis section 19 further reads metadata of lower priority and extracts their values (step S5-5). Here, the document instance management section 18 may notify to the user that no match has been made to the metadata of high priority, and inquire the user as to whether search is further made for metadata of lower priority. When there is any document instance with its metadata of lower priority being in match with "XXX Taro", the document instance management section 18 notifies the user that a pertinent document has been found step S5-6, Yes), and presents the user with the location or the like at which the document instance is managed, so as to enable the user to access the document instance (step S5-10).

If no matched document instance has been searched for here in this apparatus and system, the metadata extraction and analysis section 19 can further search other apparatuses and systems by using the external communication section 21 (step S5-7). For instance, this can be done as follows. That is, an interface for such searches is provided as a Web service for each of the apparatuses and systems, so that the user can request a search to another apparatus and system through the external communication section 21 by making use of such an interface, and obtain the searched result. Here, the document instance management section 18 may notify the user that no match has been made to the metadata of document instances on the pertinent apparatus and system, and inquire the user as to whether to further search the metadata of document instances on other apparatuses and systems.

On the other hand, if no matched document has been found (step S5-8, No), the document instance management section 18 notifies the user that there exists no document with its creator, "XXX Taro", wanted by the user on the pertinent apparatus and system or on the apparatuses and systems which can be accessed by the user through the external communication section 21 (step S5-9), and terminates the processing (step S5-11).

Embodiment 6

Figure 18:
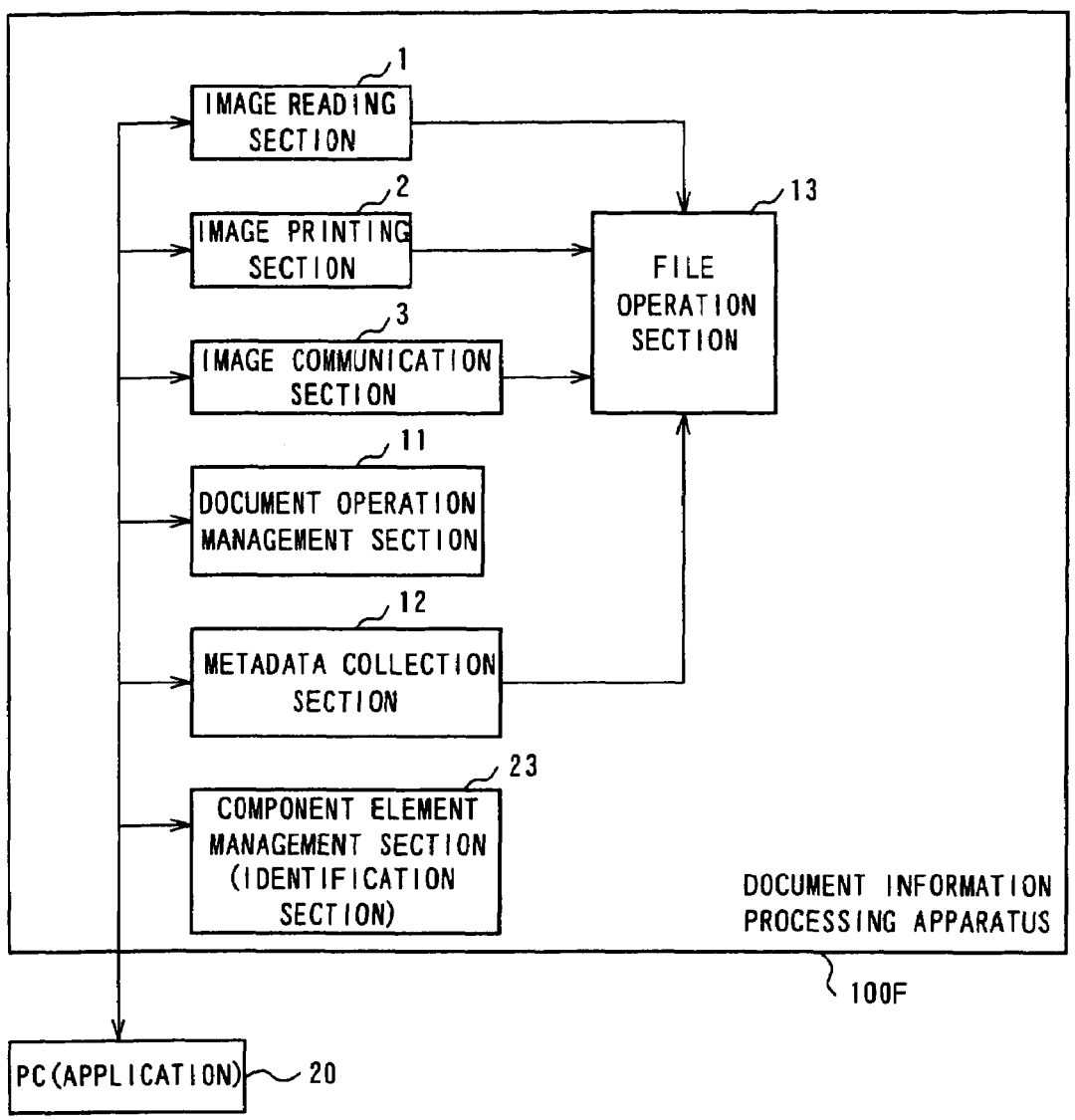
FIG. 18 is a functional block diagram showing a document information processing apparatus according to a sixth embodiment of the present invention.

FIG. 18 is a functional block diagram that illustrates a sixth of the present invention. In a document information processing apparatus 100F according to the sixth embodiment, provision is made for a component element management section 23 corresponding to an identification section of the present invention, in addition to the functional blocks of the first embodiment shown in FIG. 3.

The component element management section 23 can be constituted by a software module that identifies and grasps individual elements (pages, paragraphs, character areas, diagram areas, etc.) constructing the contents of a document (page images, etc., for the entire document), and individually manages them. The functions as set forth in the first embodiment can be achieved by component elements, respectively, by identifying the contents for the component elements, respectively. For example, with respect to a certain diagram "System FIG. A" of a scanned document "Patent Proposal", it is possible to set the [creator], [creator password] and [creation date and time] thereof. That is, these pieces of data can be possessed as metadata for a component element "System FIG. A Image Reading Apparatus" thereof, so that when the Figure is copied and pasted as "System FIG. B" to another document "Design Specification" by means of some application, these pieces of metadata and their values can be set to a pertinent component element "System FIG. B" of the document "Design Specification". As a result, it becomes possible to decide that the diagram "System FIG. B" existing in the "Design Specification" is the one scanned from the original at the date and time "2004/6/19, 14:30:10" by the person "XXX Taro". Similarly, what has been stated in the third and fourth embodiments can also be achieved by component elements, respectively.

The document instances created in this manner are illustrated in FIG. 19. Although documents B-1, F-1 copied to the destination location are mutually different from each other in terms of the metadata values of [creator], [creator password], [creation date and time] and [title], the metadata given to the previous component elements are saved or stored for the component elements copied.

Embodiment 7

A seventh embodiment of the present invention describes an example in which from once acquired metadata (temporary metadata), there is obtained secondary metadata relevant thereto, which is then written or described into a file as metadata.

Figure 20:
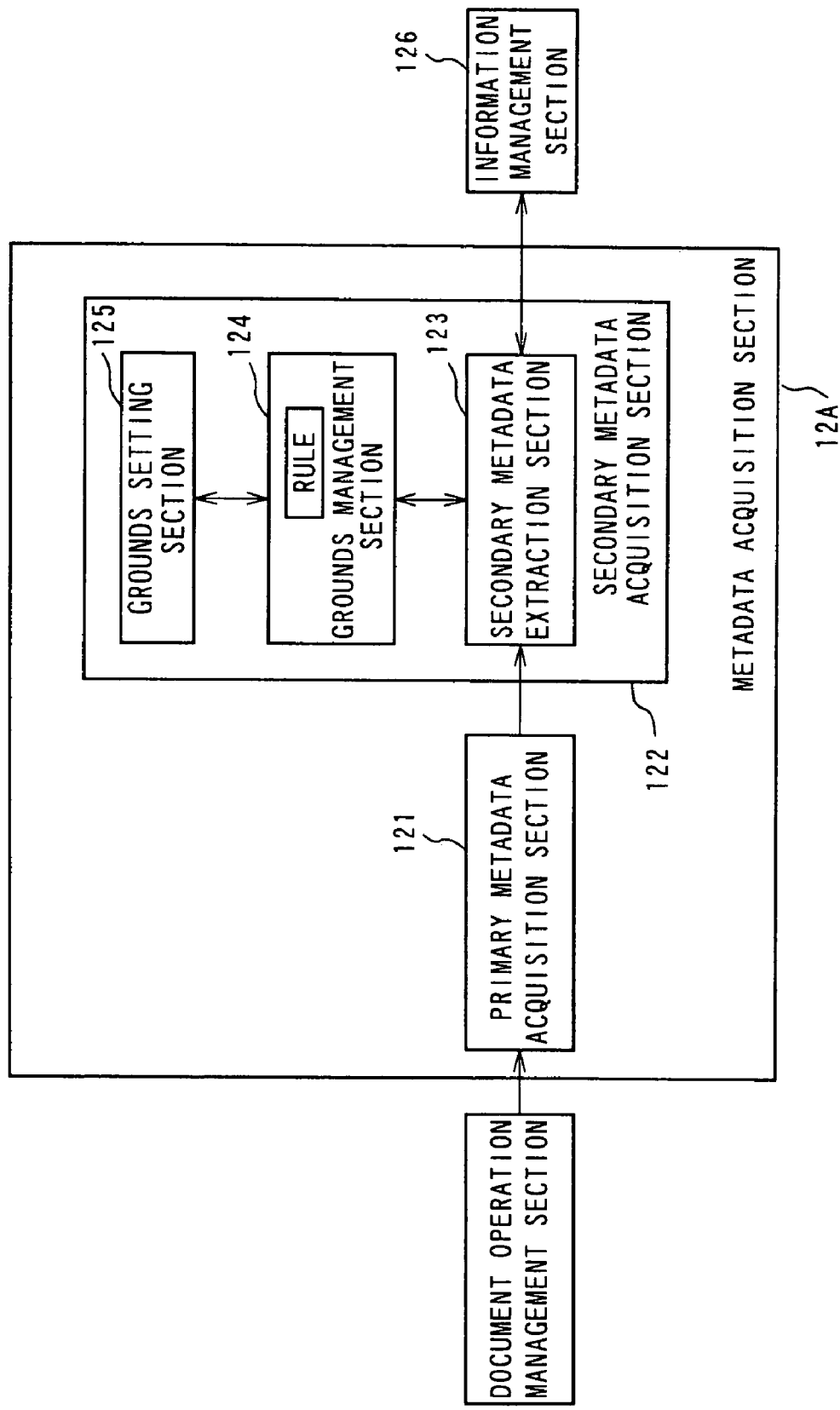
FIG. 20 is a functional block diagram showing a metadata acquisition part of a document information processing apparatus according to a seventh embodiment of the present invention.

FIG. 20 is a functional block diagram that illustrates the details of a metadata acquisition section in a document information processing apparatus according to the seventh embodiment. In the seventh embodiment, the configuration thereof other than the metadata acquisition section can be the same configuration as any of the configurations shown in the first through sixth embodiments, and hence an explanation there is omitted here.

This metadata acquisition section 12A includes a primary metadata acquisition section 121 that corresponds to the metadata acquisition section explained in the first through sixth embodiments and serves to acquire primary metadata, and a secondary metadata acquisition section 122 that serves to acquire secondary metadata by using the primary metadata. The secondary metadata acquisition section 122 includes a secondary metadata extraction section 123, a grounds management section 124 and a grounds setting section 125.

This secondary metadata acquisition section 122 determines and acquires new metadata based on a single piece of metadata or a plurality of pieces of metadata collected by the operation or manipulation of a document (e.g., a [creation event] such as a conference is identified from the [creator] and the [creation date and time]). The secondary metadata extraction section 123 extracts the secondary metadata based on information from an external information management section 126 and the rule provided from the grounds management section 124. The grounds management section 124 manages grounds of a determination (e.g., the rule stored in a file or a data base) made when the secondary metadata is acquired by the secondary metadata acquisition section 122. The grounds setting section 125 sets the addition, deletion, editing and the like of the determination grounds managed by the grounds management section 124. Each of these sections can be constituted by a software module for example.

DESCRIPTION OF THE OPERATION

Hereinafter, reference will be made, as one example of the operation of the seventh embodiment, to the case where when a document read by a scanner is converted into a document file, a corresponding event (conference, here) is determined from the name of a user who logged in the image reading section 1 so as to read the document, the date and time at which the operation was carried out, and schedule information (the schedule on a date and time is found from a calendar and a timetable) managed by an external scheduler, etc., while using a flow chart of FIG. 21.

Figure 4:
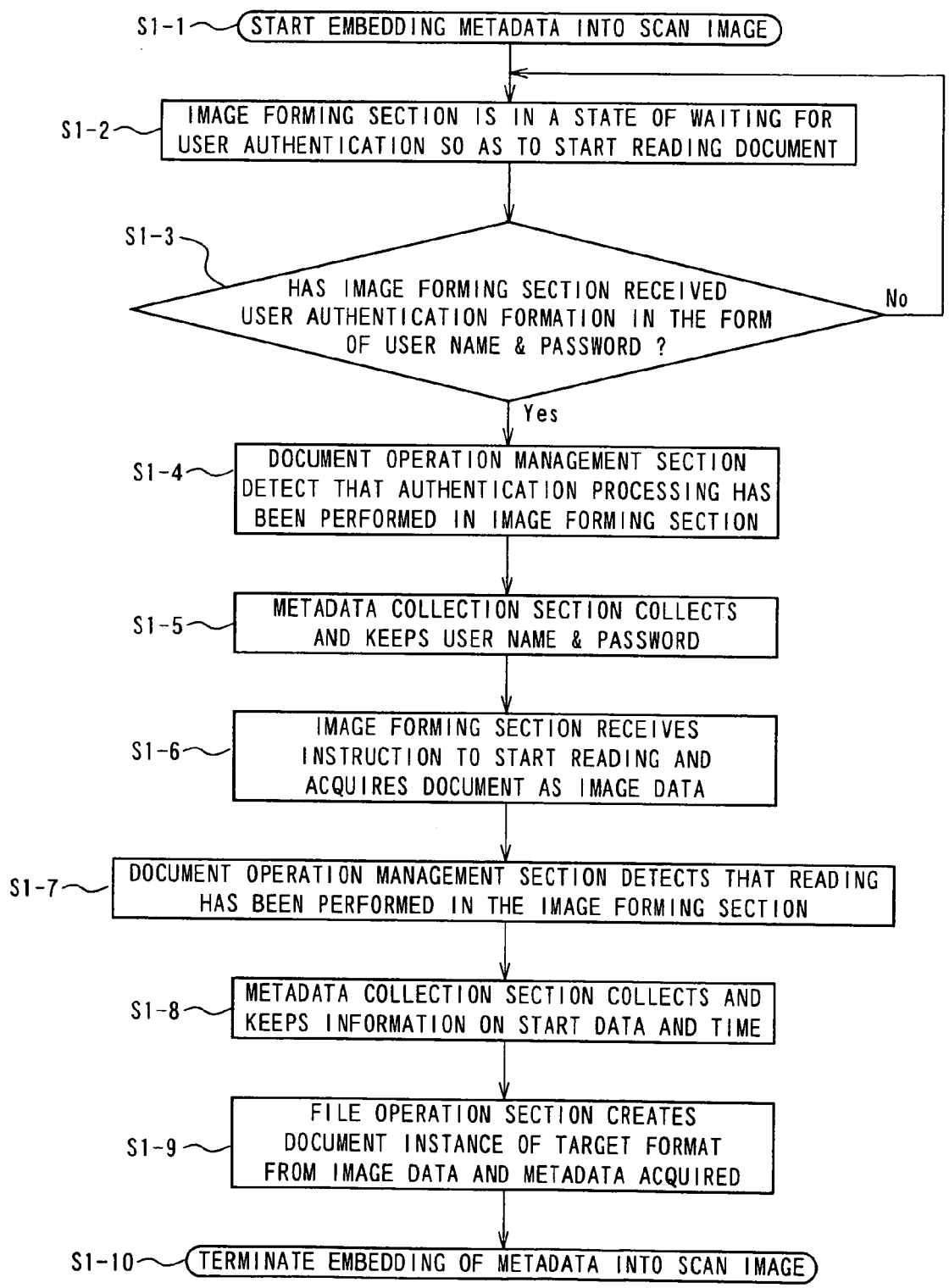
FIG. 4 is a flow chart showing the operation of the first embodiment.
Figure 21:
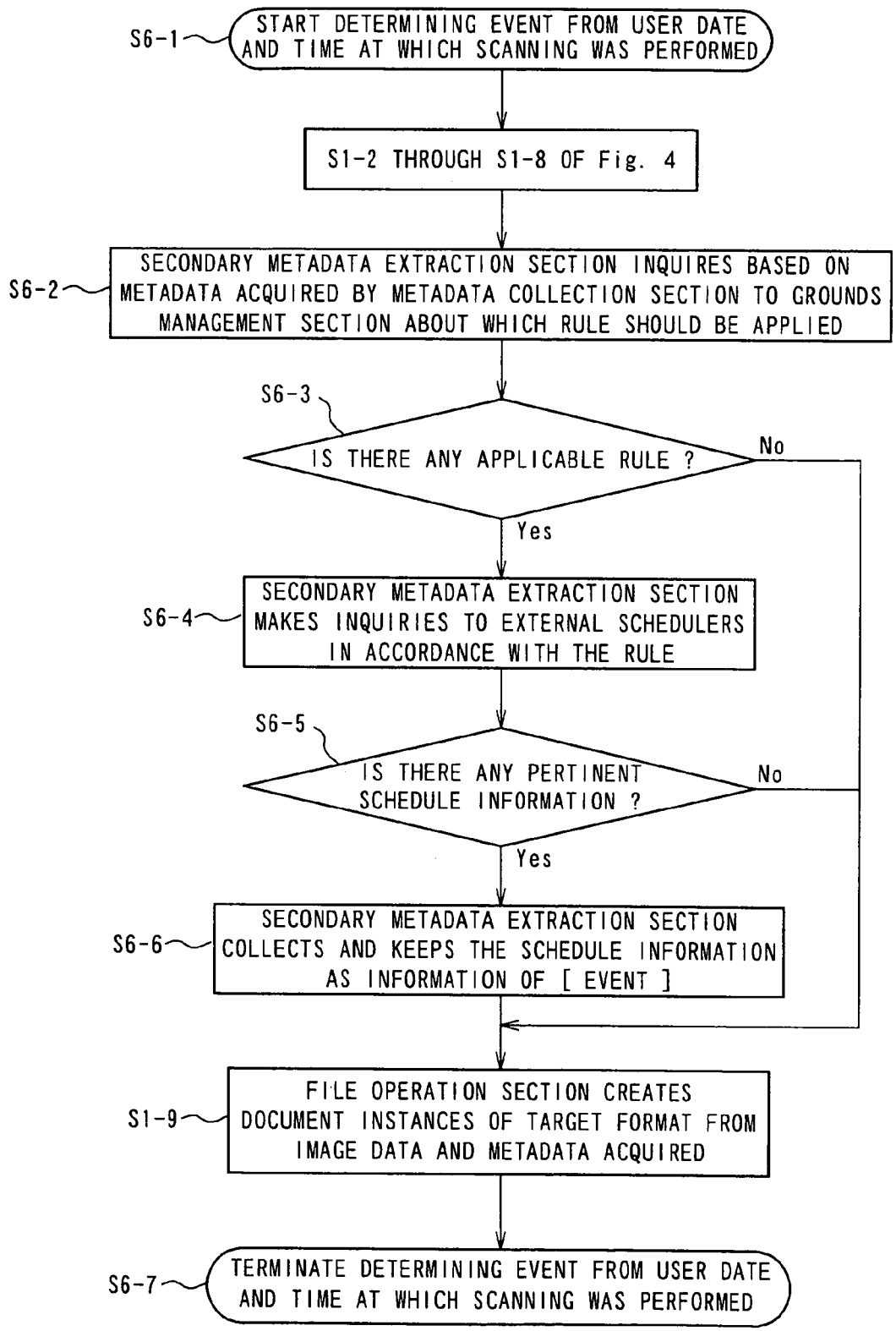
FIG. 21 is a flow chart showing the operation of the seventh embodiment.

Here, note that in the operation of FIG. 21, step S1-2 through step S1-8 are the same as those in the first embodiment shown in FIG. 4, and hence an explanation thereof is omitted here. The secondary metadata extraction section 123 acquires a set of metadata that have been obtained by the metadata collection section 12, and starts the processing of determining whether any secondary metadata can be acquired based on the set of metadata thus obtained (step S6-1). When such a determination is made, the secondary metadata extraction section 123 sends an inquiry to the grounds management section 124 along with the set of metadata (step S6-2). Here, note that the grounds management section 124 has a rule that schedule information relevant to a document can be acquired by making an inquiry to an external scheduler while using as keys the values of the metadata of the [creator] and the [creation date and time] of the document, and makes a determination as to whether such a rule has been able to be found (or whether such a rule can be applied) (step S6-3).

When any applicable rule has not been found (step S6-3, No), it is determined that no secondary metadata can be acquired, so the instance of the document is created based on the metadata acquired by the primary metadata acquisition section (the metadata collection section 12 in FIG. 3)(step S1-9), and then the processing is terminated step S6-7). On the other hand, when an applicable rule has been found (step S6-3, Yes), the secondary metadata extraction section 123 makes an inquiry to an external scheduler or the like which has schedule information in accordance with the applicable rule (step S6-4). When there exist schedule information corresponding to the values of the metadata (step S6-5, Yes), the schedule information is acquired and kept or stored as secondary metadata called an [event] (step S6-6), whereas when there exists no corresponding schedule information (step S6-5, No), no secondary metadata is set and the processing is terminated (step S6-7).

Figure 22:
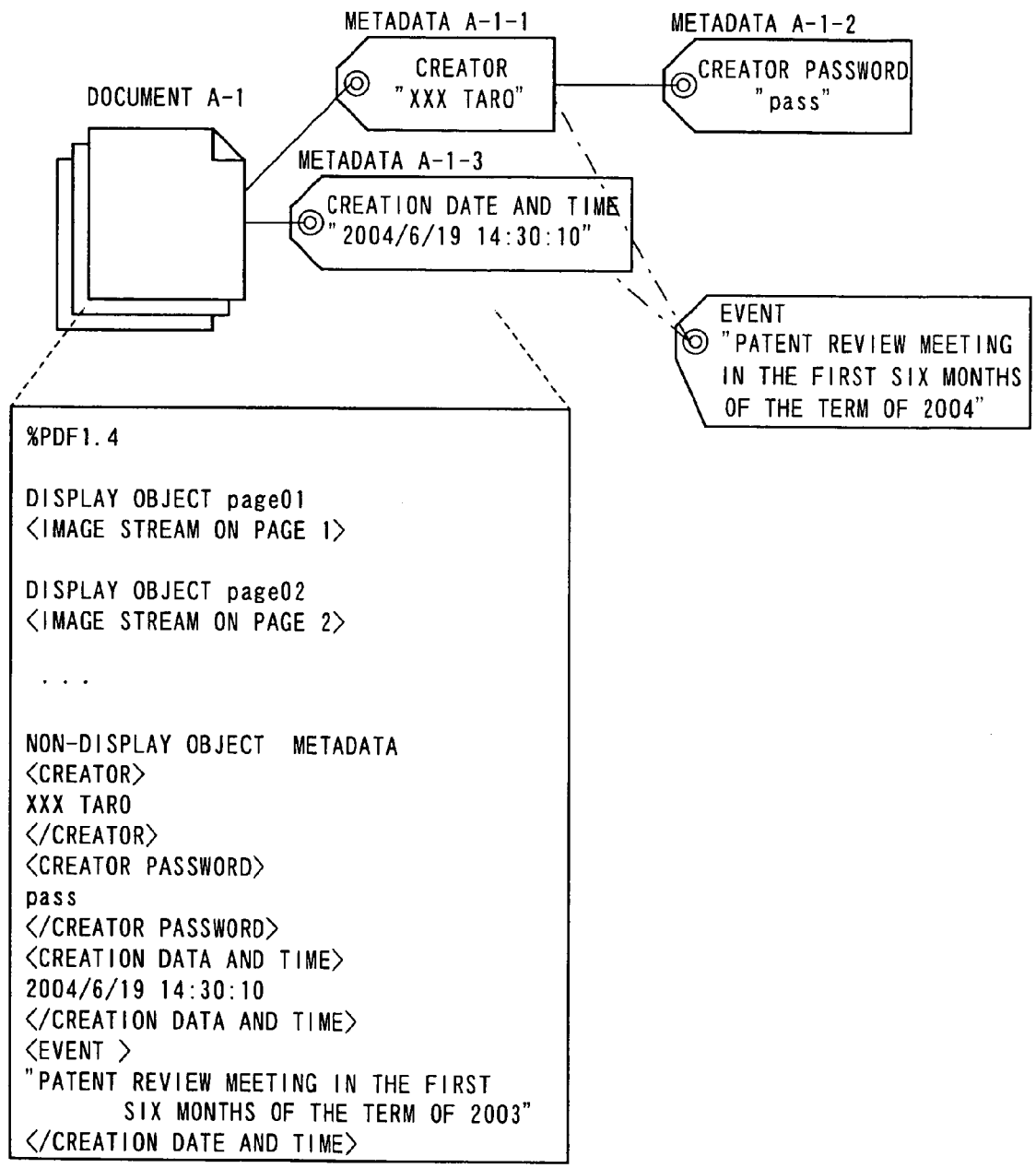
FIG. 22 is a view conceptually showing a document obtained in the seventh embodiment.

The document instance created in this manner is illustrated in FIG. 22. Here, the schedule information, "A patent review meeting in the first six months of the term of 2004 will be held from 13:00 to 14:30 of 2004/6/19.", has been managed by the scheduler of Mr. "XXX Taro". Accordingly, the secondary metadata extraction section 123 acquires this schedule information as an event relevant to this document, set the value of the event as "patent review meeting in the first six months of the term of 2004", and embeds this value into the document instance.

Embodiment 8

Figure 23:
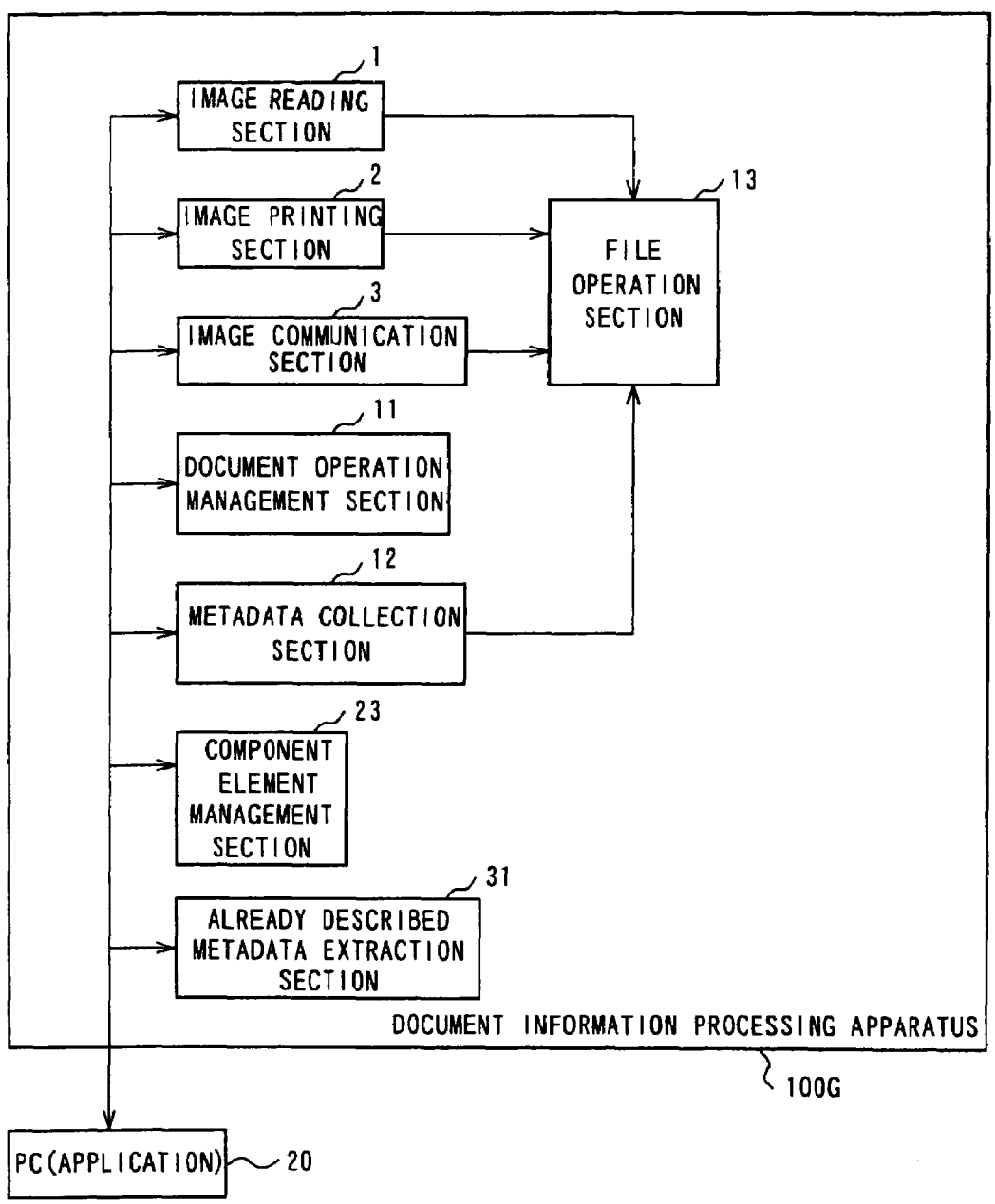
FIG. 23 is a functional block diagram showing a document information processing apparatus according to an eighth embodiment of the present invention.

FIG. 23 is a functional block diagram that illustrates an eighth embodiment of the present invention. In a document information processing apparatus 100G according to an eighth embodiment, reference will be made to the case where provision is made for a component management section 23 and an already-described or existing metadata extraction section 31, in addition to the functional blocks of the first embodiment shown in FIG. 3, and the component management section 23, the already-described metadata extraction section 31 and the metadata collection section 12 together constitute a multistage management section that is able to manage metadata in a multistage manner.

This multistage management section serves to manage the metadata in a multistage manner in accordance with the change of a document instance, and is constituted by a software module for example.

Next, reference will be made to the operation of the eighth embodiment of the present invention while using a flow chart shown in FIG. 24. As described in the sixth embodiment, when a component element (page or diagram) of a document is operated or manipulated, the metadata in the unit of the document instance can be succeeded even with each component unit of the document, but the component element need to succeed the metadata in the unit of each document instance for new document instances. Therefore, these pieces of metadata are managed in a multistage manner by the multistage management section, so that the traceability to the original document and the search in the existing metadata can be satisfied at the same time.

Figure 24:
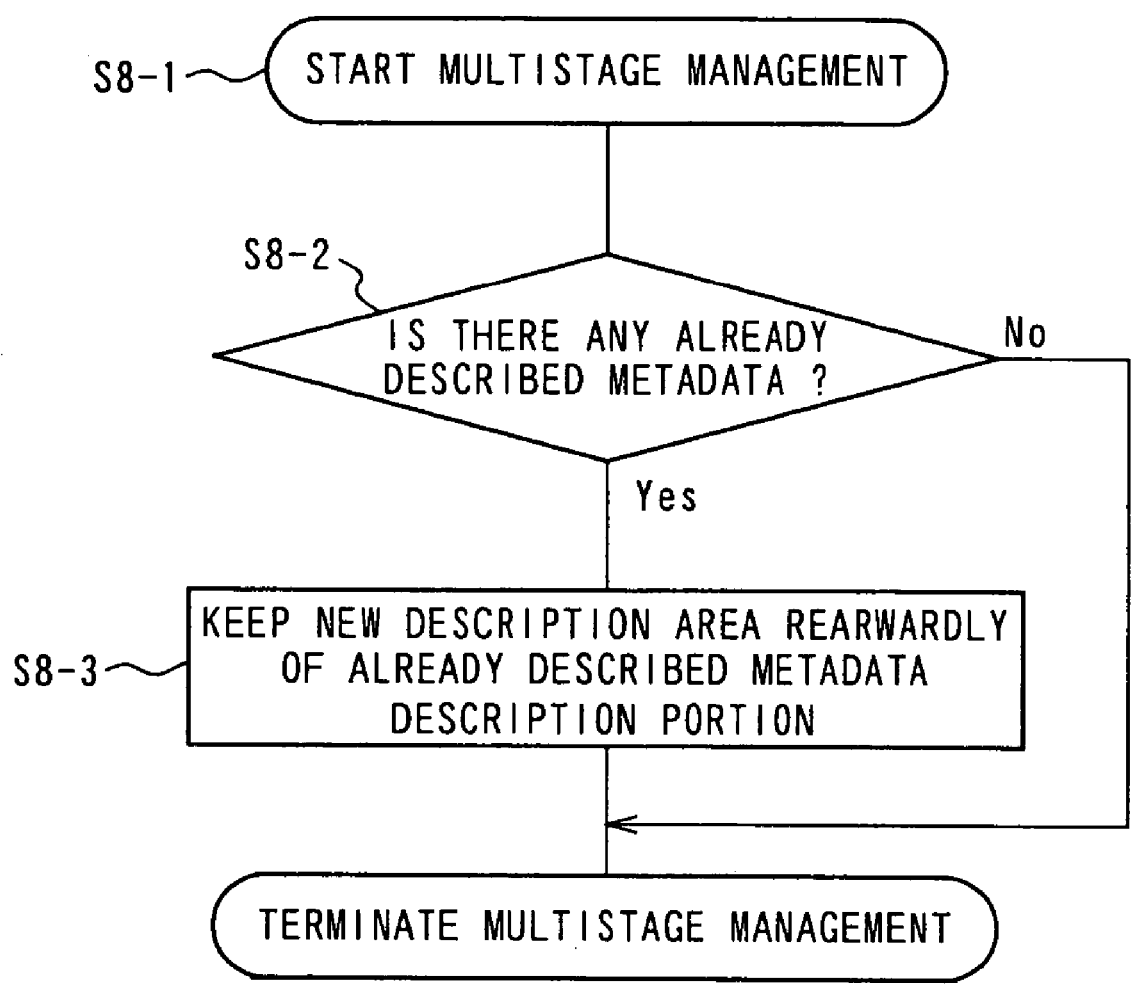
FIG. 24 is a flow chart showing the operation of the eighth embodiment.

In FIG. 24, a multistage management is started based on an operation or manipulation of the document (step S8 -1). The component management section 23 determines or identifies respective component elements, and the already-described metadata extraction section 31 determines whether there is any already-described metadata in each component element (step S8-2). When it is determined that there is some already-described metadata, the already-described metadata extraction section 31 extracts the already-described metadata, and provides it to the metadata collection section 12 by associating it with the respective component elements. The metadata collection section 12 keeps a new metadata description area rearwardly of an already-described metadata description portion, attaches the metadata (new metadata) obtained by a new operation or manipulation to the new metadata description area, and provides the entire metadata thus formed to the file operation section 13.

Figure 25:
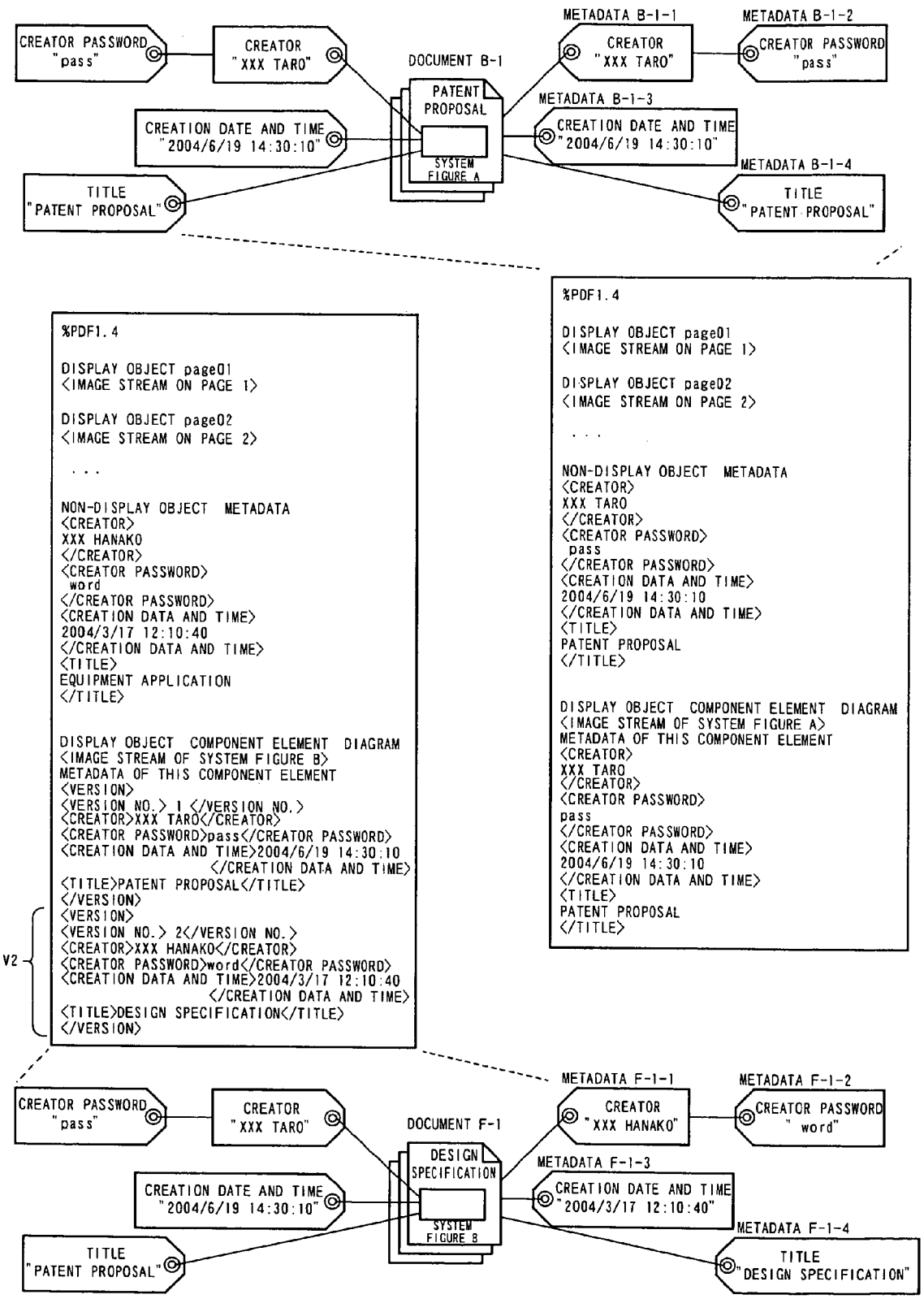
FIG. 25 is a view conceptually showing a document obtained in the eighth embodiment.

The document instance created in this manner is illustrated in FIG. 25. In FIG. 25, a document at the location of destination into which a component element is copied is different from the component element copied in the values of metadata of their [creators], [creator passwords], [creation dates and times] and [titles], and hence the metadata given to a current component element is held or stored as a different version V2 separate from the component element copied there.

Although in the above-mentioned embodiments, reference has been made to the case where the functions to execute programs shown in the respective flow charts are recorded in each apparatus beforehand, the present invention is not limited to this but similar functions or programs can be downloaded into the device or system via a network. Alternatively, a computer-readable recording medium storing therein similar functions or programs can be installed in the apparatus or system. In this regard, note that the recording medium can be of any form, such as for example a ROM, which is able to store programs and which is able to be read out by the apparatus. In addition, the functions to be obtained by such pre-installation or downloading can be achieved through cooperation with an OS (operating system) or the like in the interior of the apparatus.

As described above, according to this embodiment, it is possible to prevent the occurrence of mismatches in the management by collecting metadata in accordance with operation timing such as the inputting, outputting, editing or the like of a document, and by adding the metadata to the instance of the document itself. In addition, by collecting metadata in accordance with the contents of the document, and by adding the metadata to the instance of the document itself, search and classification can be easily carried out from the contents of the instance of the document in an automatic fashion.

What is claimed is:

1. A document information processing apparatus comprising:
   a document input and output section that is able to at least input or output a document as image data, said document input and output section including at least one of an image reader that scans a document and generates image data from the scanned document or an image communication section that sends and receives image data of a document via fax or e-mail;
   an operation section that designates a file format of image data generated by said document input and output section;
   a format conversion section that converts the image data into the file format designated by the operation section;
   an operation timing detection section that detects predetermined operation timing for said document;
   a metadata acquisition section that acquires metadata for searching or editing of said document based on said operation timing;
   a metadata description section that describes said metadata in a predetermined format based on instance data of said document at predetermined timing with respect to the input or output of said document;
   processing unit that controls the operation of said document input and output section, said operation timing detection section, said metadata acquisition section, and said metadata description section, wherein said processing unit controls said metadata description section such that the metadata acquired by said metadata acquisition section is described in a file converted by said format conversion section; and
   an image analysis section that acciuires layout information by analyzing an image file, performs the reading of text information in areas that are recognized as text or character areas by using an optical character reader, and uses the data obtained as metadata.

2. The document information processing apparatus as set forth in claim 1, wherein said metadata acquisition section is provided with an image data analysis section that acquires said metadata by analyzing the image data.

3. The document information processing apparatus as set forth in claim 1, wherein
   said metadata description section converts said document into a file of a predetermined format based on the instance data of said document, and at the same time describes said metadata into said file.

4. The document information processing apparatus as set forth in claim 1, wherein
   said document input and output section includes an image printing section that converts the instance data of said document into a format suitable for printing;
   said metadata description section describes said metadata into the instance data of said document in said format suitable for printing; and
   a file holding section is provided that holds the instance data of said document with said metadata described therein.

5. The document information processing apparatus as set forth in claim 1, further comprising a metadata extraction and processing section that extracts the metadata described in the instance data of said document and performs prescribed processing based on the metadata thus extracted.

6. The document information processing apparatus as set forth in claim 1, further comprising a document operation management section that grasps and manages a predetermined operation on said document, wherein
   said processing section performs prescribed processing on said document based on said metadata and the operation grasped by said document operation management section.

7. The document information processing apparatus as set forth in claim 1, further comprising an identification section that identifies contents of said document as individual component elements, wherein
   said metadata acquisition section acquires the metadata recognized in each unit of said individual component elements; and
   said metadata description section describes those metadata in each unit of the respective component elements which have been recognized in each unit of said individual component elements.

8. The document information processing apparatus as set forth in claim 1, further comprising a secondary metadata acquisition section that acquires, based on the metadata acquired by said metadata acquisition section, secondary metadata associated with said metadata, wherein
   said metadata description section describes the metadata acquired by said secondary metadata acquisition section into the instance data of said document.

9. The document information processing apparatus as set forth in claim 8, wherein
   said second metadata acquisition section is provided with a grounds determination section that determines grounds for acquiring, from a single piece of metadata or a plurality of pieces of metadata, secondary metadata relevant thereto by determining the presence or absence of relevancy between said single piece of metadata or said plurality of pieces of metadata and said secondary metadata by applying a prescribed rule to said single piece of metadata or said plurality of pieces of metadata, said grounds determination section being also operable to extract the secondary metadata based on the secondary metadata acquisition grounds determined by said grounds determination section.

10. The document information processing apparatus as set forth in claim 1, wherein
    said metadata acquisition section acquires metadata in accordance with a change in the instance data of said document; and
    said metadata description section describes the metadata acquired by said metadata acquisition section into the instance data of said document in a multistage manner in accordance with a change in the instance data of said document.

11. The document information processing apparatus as set forth in claim 1, wherein said processing unit controls said metadata description section such that said metadata is described in a data area of the file which is not displayed as an image.

12. A computer readable medium storing a document information processing program to make a computer execute:
   designating a file format of image data;
   converting the image data into the file format designated by the designating step;
   detecting the timing of an operation performed on at least one of an input and an output of a document as image data;
   acquiring metadata for searching or editing of said document based on said operation timing;
   describing said metadata in a predetermined format based on instance data of said document at predetermined timing with respect to the input or output of said document; and
   controlling the operation of said designating step, said converting step, said detecting step, said acquiring step and said describing step, wherein the describing step is controlled such that the metadata acquired in said acquiring step is described in a file converted in said converting step; and
   acquiring layout information by analyzing an image file, performing reading of text information in areas that are recognized as text or character areas by using an optical character reader, and using the data obtained as metadata.

13. The computer readable medium as set forth in claim 12, wherein
   said acquiring step acquires said metadata by analyzing the image data, said analyzing of said image data being executed by said computer.

14. The computer readable medium as set forth in claim 12, further comprising:
   converting the instance data of said document into a format suitable for printing;
   wherein said describing step describes said metadata into the instance data of said document in said format suitable for printing; and
   holding said data with said metadata described therein.

15. The computer readable medium as set forth in claim 12, further comprising:
   extracting the metadata described in the instance data of said document, and performing prescribed processing based on the metadata thus extracted.

16. The computer readable medium as set forth in claim 12, further comprising:
   determining and managing a predetermined operation on said document; and
   in said processing step, said computer is made to execute prescribed processing on said document based on said metadata and the operation determined in said document operation management step.

17. The computer readable medium as set forth in claim 12, further comprising:
   identifying contents of said document as individual component elements; and
   acquiring the metadata recognized in each unit of said individual component elements in said metadata acquisition step, and describing those pieces of metadata in each unit of the respective component elements which have been recognized in each unit of said individual component elements in said metadata description step.

18. The computer readable medium as set forth in claim 12, further comprising:
   acquiring, based on the metadata acquired in said metadata acquisition step, secondary metadata associated with said metadata; and
   in said metadata description step, said computer is made to execute describing the metadata acquired in said secondary metadata acquisition step into the instance data of said document.

19. The computer readable medium as set forth in claim 12, further comprising:
   acquiring metadata in accordance with a change in the instance data of said document in said metadata acquisition step, and describing the metadata acquired in said metadata acquisition step into the instance data of said document in a multistage manner in accordance with a change in the instance data of said document in said metadata description step.

20. The computer readable medium as set forth in claim 12, wherein said controlling step performs control such that said metadata is described in a data area of the file which is not displayed as an image.

* * * * *